(12) United States Patent
Kanda et al.

(10) Patent No.: US 7,971,862 B2
(45) Date of Patent: Jul. 5, 2011

(54) VAPORIZER, FUEL CELL HAVING VAPORIZER, AND VAPORIZING METHOD

(75) Inventors: Akihito Kanda, Ome (JP); Yasunari Kabasawa, Hanno (JP); Naotomo Miyamoto, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 1151 days.

(21) Appl. No.: 11/708,509

(22) Filed: Feb. 20, 2007

(65) Prior Publication Data

US 2007/0193533 A1 Aug. 23, 2007

(30) Foreign Application Priority Data

Feb. 21, 2006 (JP) .................................. 2006-043708
Mar. 16, 2006 (JP) .................................. 2006-072227

(51) Int. Cl.
*B01F 3/04* (2006.01)
(52) U.S. Cl. ......... 261/128; 261/142; 261/18.1; 261/99; 261/DIG. 65
(58) Field of Classification Search .............. 261/18.1, 261/27, 99, 104, 107, 142, 150, 154, DIG. 65, 261/DIG. 89, 128
See application file for complete search history.

(56) References Cited

U.S. PATENT DOCUMENTS

| | | | | |
|---|---|---|---|---|
| 3,688,083 A | * | 8/1972 | Rice et al. | 392/488 |
| 3,781,518 A | * | 12/1973 | Power et al. | 392/398 |
| 3,943,330 A | * | 3/1976 | Pollock et al. | 392/387 |
| 3,977,364 A | * | 8/1976 | Gijsbers et al. | 122/366 |
| 4,110,419 A | * | 8/1978 | Miller | 261/142 |
| 4,879,997 A | * | 11/1989 | Bickford | 128/200.21 |
| 5,117,482 A | * | 5/1992 | Hauber | 392/492 |
| 5,259,995 A | * | 11/1993 | Matalis | 261/107 |
| 5,267,584 A | * | 12/1993 | Smith | 137/13 |
| 5,337,738 A | * | 8/1994 | Heinonen | 128/203.12 |
| 6,347,936 B1 | * | 2/2002 | Young et al. | 431/11 |
| 6,682,839 B2 | | 1/2004 | Wilkinson et al. | |
| 6,835,483 B2 | | 12/2004 | Ballantine et al. | |
| 7,390,588 B2 | | 6/2008 | Yamada et al. | |
| 7,712,729 B2 | * | 5/2010 | Kabasawa et al. | 261/142 |
| 7,736,216 B2 | | 6/2010 | King et al. | |
| 7,763,216 B2 | | 7/2010 | Yamamoto et al. | |
| 7,763,368 B2 | | 7/2010 | Kaye et al. | |
| 2002/0006534 A1 | | 1/2002 | Wilkinson et al. | |
| 2004/0244290 A1 | | 12/2004 | Yamamoto et al. | |
| 2005/0014040 A1 | | 1/2005 | Kaye | |
| 2005/0186455 A1 | | 8/2005 | Kaye et al. | |

(Continued)

FOREIGN PATENT DOCUMENTS

JP 05-017335 U 3/1993

(Continued)

OTHER PUBLICATIONS

Korean Office Action (and English translation thereof) dated Dec. 20, 2007, issued in a counterpart Korean Application.

(Continued)

*Primary Examiner* — Scott Bushey
(74) *Attorney, Agent, or Firm* — Holtz, Holtz, Goodman & Chick, PC

(57) ABSTRACT

Disclosed is a vaporizer including a first liquid suction section to suck a first liquid; a second liquid suction section to suck a second liquid; and a heating element to heat the first liquid suction section and the second liquid suction section to vaporize the first liquid and the second liquid.

18 Claims, 14 Drawing Sheets

U.S. PATENT DOCUMENTS

| | | |
|---|---|---|
| 2008/0171241 A1 | 7/2008 | Kaye et al. |
| 2009/0123797 A1 | 5/2009 | Kaye et al. |
| 2010/0142934 A1* | 6/2010 | Sellers et al. ............... 392/387 |

FOREIGN PATENT DOCUMENTS

| | | |
|---|---|---|
| JP | 2001-263649 A | 9/2001 |
| JP | 2004-047260 A | 2/2004 |
| JP | 2005-067990 A | 3/2005 |
| TW | 240449 B | 9/2005 |
| TW | 244233 B | 11/2005 |
| WO | WO 00/33407 A1 | 6/2000 |
| WO | WO 2005/004257 A2 | 1/2005 |

OTHER PUBLICATIONS

Taiwanese Office Action dated Aug. 19, 2010 (and English translation thereof) in counterpart Taiwanese Application No. 096106048.

* cited by examiner

US 7,971,862 B2

VAPORIZER, FUEL CELL HAVING VAPORIZER, AND VAPORIZING METHOD

BACKGROUND OF THE INVENTION

1. Field of the Invention

The present invention relates to a vaporizer for vaporizing liquid, a fuel cell having the vaporizer, and a vaporizing method.

2. Description of the Related Art

In recent years, fuel cells receives attention as clean power supply having high energy converting efficiency, and the fuel cells are widely introduced commercially such as fuel cell automobiles and electrified housings. Studies are carried out for commercial viability of the power supply by the fuel cells also in a portable electronic equipment such as cellular phones and notebook personal computers in which research and development of downsizing are pursued abruptly.

Fuel cells are classified into two types, i.e., a reforming type and a fuel direct type. The reforming type is a type in which hydrogen is produced from fuel and water using a reforming device, and the produced hydrogen is supplied to a fuel cell like the reforming of water vapor. In the fuel direct type, fuel and water are not reformed, and they are supplied to a fuel cell. Generally, fuel and water are stored in the form of liquid, and the fuel and water are vaporized and then, a mixture of the fuel and water is supplied to the reforming device. Therefore, a vaporizer for vaporizing fuel and water is required, and research and development concerning such vaporizer are pursued together with development of the fuel cell (see Japanese Patent Applications Laid-open Nos. 2004-47260 and 2001-263649 for example).

If such a vaporizer is made compact, since the flow rate is small, fuel is easily heated excessively. Therefore, fuel is irregularly bumping, liquid drop is mixed in the vaporized liquid and it is difficult to control the stable vaporization. When a mixture of a plurality kinds of liquid having different boiling points such as fuel and water is vaporized, influence of bumping is serious, and it is more difficult to control.

When a post reforming device or a fuel cell is disposed, such an instable factor makes reforming performance by the reforming device or electric power generating performance by the fuel cell instable.

SUMMARY OF THE INVENTION

Hence, the present invention has been accomplished to solve such a problem, and it is a major object of the invention to provide a vaporizer and a vaporizing method capable of efficiently supplying a mixture when a plurality kinds of liquid are to be vaporized.

According to a first aspect of the present invention, there is provided a vaporizer comprising:
a first liquid suction section to suck a first liquid;
a second liquid suction section to suck a second liquid; and
a heating element to heat the first liquid suction section and the second liquid suction section to vaporize the first liquid and the second liquid.

According to a second aspect of the present invention, there is provided a fuel cell having the above-mentioned vaporizer according to the first aspect of the present invention.

According to a third aspect of the present invention, there is provided a vaporizer comprising:
a first liquid suction section which sucks a first liquid and which vaporize the first liquid,
a second liquid suction section which sucks a second liquid and which vaporize the second liquid, and a heating element provided closer to the first liquid suction section than the second liquid suction section.

According to a fourth aspect of the present invention, there is provided a vaporizing method of liquid, comprising:
interposing a partitioning material between a plurality of liquid sucking sections;
allowing one end of each of the liquid sucking sections to absorb different kinds of liquids;
allowing the liquids respectively absorbed by the liquid sucking sections to penetrate the other ends; and
heating the other end of each of the liquid sucking sections to vaporize the liquids.

According to a fifth aspect of the present invention, there is provided a vaporizer comprising:
a heat insulation case;
a liquid sucking section, a suction side end thereof for sucking liquid being disposed outside of the heat insulation case and a discharging side end thereof for vaporizing and discharging the liquid sucked by the suction side end being accommodated in the heat insulation case; and
a heater to heat a discharging side end of the liquid sucking section.

According to a sixth aspect of the present invention, there is provided a vaporizer comprising:
a liquid sucking section to suck liquid from a suction side end and to allow the sucked liquid to penetrate to a discharging side end;
a heater to heat the discharging side end of the liquid sucking section; and
a heat radiating section which is in contact with the suction side end and which has a thermal conductivity higher than that of the liquid sucking section.

BRIEF DESCRIPTION OF THE DRAWINGS

The above and further objects, features and advantages of the present invention will become more apparent from the following detailed description taken in conjunction with the accompanying drawings, wherein.

DESCRIPTION OF THE PREFERRED EMBODIMENTS

The best mode for carrying out the present invention will be explained with reference to the drawings. Although various limitations which are preferable for carrying out the invention are proposed in the following exemplary examples, the scopes of the invention are not limited to the exemplary examples and illustrated examples.

First Exemplary Example

Figure 1:
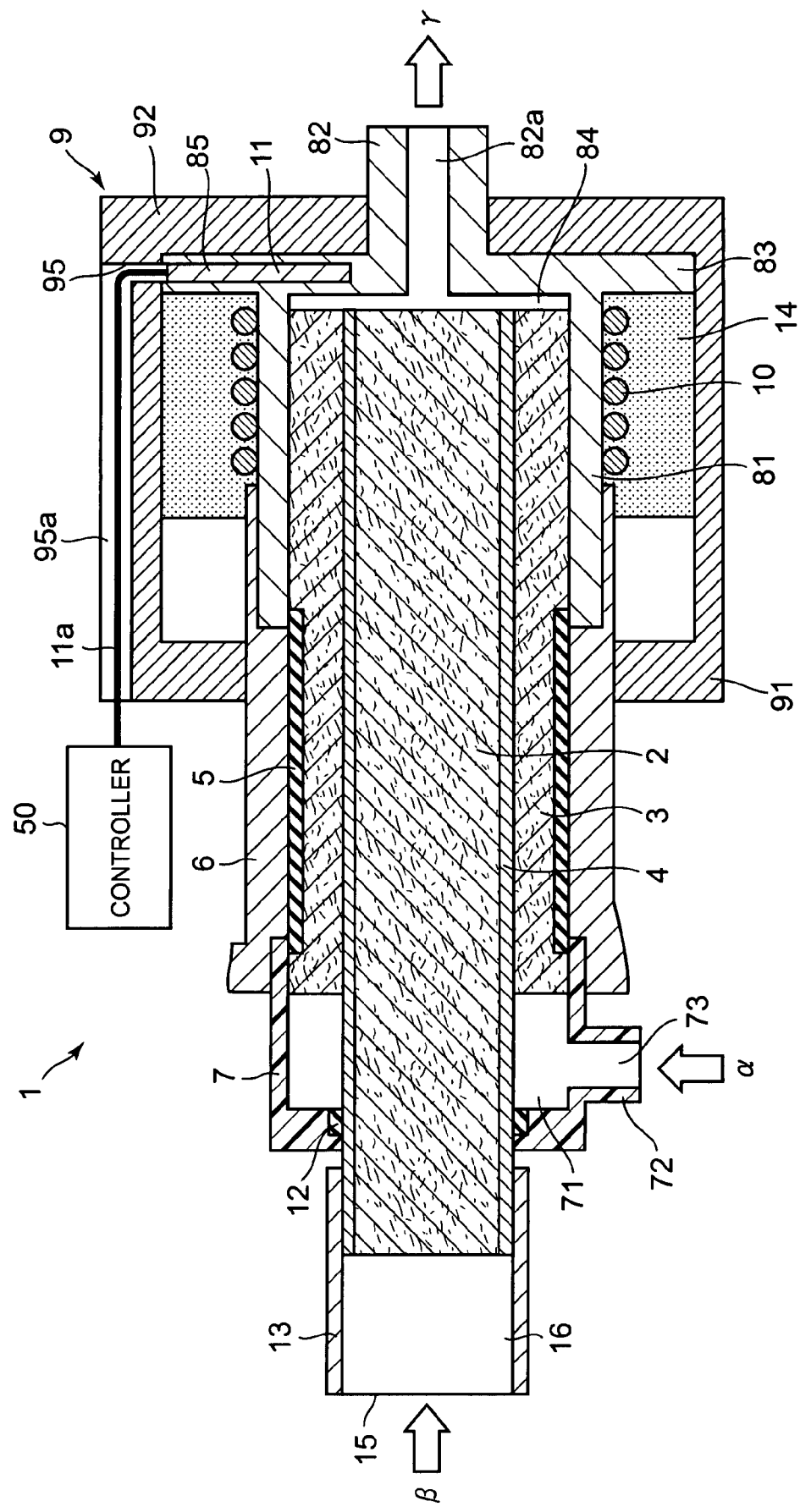
FIG. 1 is a sectional view of a vaporizer of a first exemplary example in a vertical section taken along a center axis which is concentric with a first liquid sucking section, a second liquid sucking section, and a partition section.
Figure 2:
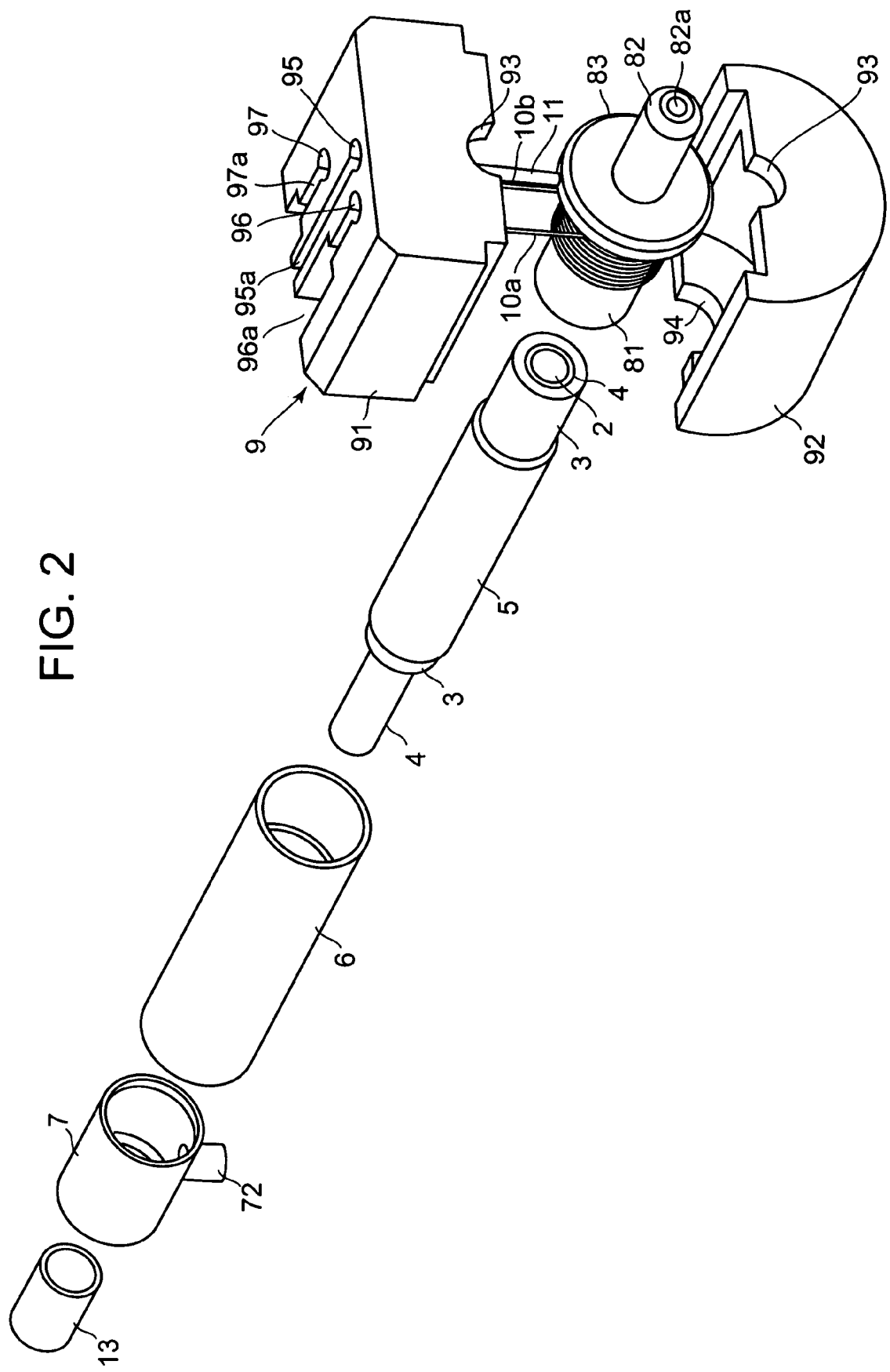
FIG. 2 is an exploded perspective view of the vaporizer.

FIG. 1 is a schematic sectional view of a vaporizer 1. FIG. 2 is an exploded perspective view of an upper surface, a front surface and a right surface of the vaporizer 1.

As shown in FIGS. 1 and 2, the vaporizer 1 includes a first liquid suction section 3, a second liquid suction section 2, a partition section 4, a contractile tube 5, an elastic tube 6, a first liquid introducing section 7, a second liquid introducing section 13, a discharging section 8, a heat insulation case 9, a heating element 10 and a temperature sensor 11.

The second liquid suction section 2 is a core material formed into a rod-like shape, more specifically, a columnar shape. The second liquid suction section 2 is a porous body in which a fine space is formed, and the second liquid suction section 2 can suck liquid by capillary action. The second liquid suction section 2 may be formed by solidifying inorganic fiber or organic fiber using bonding material (e.g., epoxy resin), may be formed by sintering inorganic powder, may be formed by solidifying inorganic powder using bonding material (e.g., epoxy resin), may be a mixture body of graphite and glassy carbon, or may be formed by binding a large number of thread materials comprising inorganic fiber or organic fiber and solidifying the same using bonding material. An acrylic fiber flux core can be used as the second liquid suction section 2 for example. Alternatively, the plurality kinds of the above materials may be mixed and used as the second liquid suction section 2.

The second liquid suction section 2 is fitted into the cylindrical partition section 4, a front end and a rear end of the liquid sucking section 2 are opened, and its outer side of the liquid sucking section 2 is covered with the partition section 4. Liquid sucked by the second liquid suction section 2 and liquid sucked by the first liquid suction section 3 can not penetrate the partition section 4. The partition section 4 is made of material which is not deformed and deteriorated by heat of the heating element 10. The partition section 4 is provided with a cylindrical metal material such as stainless steel (SUS 316) for example. Cross sectional shapes of the partition section 4 and the second liquid suction section 2 in a direction intersecting with a plane of FIG. 1 at right angles are concentric. An outer peripheral surface of the second liquid suction section 2 and an inner peripheral surface of the partition section 4 come into intimate contact with each other. The length of the second liquid suction section 2 and the length of the partition section 4 are equal to each other, and both end surfaces of the second liquid suction section 2 and both end surfaces of the partition section 4 are aligned.

The first liquid suction section 3 is formed into a cylindrical shape having a space into which the second liquid suction section 2 and the partition section 4 are inserted. The first liquid suction section 3 is a porous body surrounding the internal space, and can suck liquid by capillary action. The first liquid suction section 3 is made of the same member as that of the second liquid suction section 2. The second liquid suction section 2 covered with the partition section 4 is fitted into an inner wall of the first liquid suction section 3, the cross sectional shapes of the second liquid suction section 2 and the first liquid suction section 3 in a direction intersecting with the plane of FIG. 1 at right angles are concentric, and the first liquid suction section 3 and the second liquid suction section 2 are partitioned by the partition section 4. Therefore, liquid which penetrates the first liquid suction section 3 does not move to the second liquid suction section 2 through the partition section 4, and liquid which penetrates the second liquid suction section 2 does not move to the first liquid suction section 3 through the partition section 4. An inner diameter of the first liquid suction section 3 and an outer diameter of the partition section 4 are substantially equal to each other, and an inner peripheral surface of the first liquid suction section 3 is in intimate contact with an outer peripheral surface of the partition section 4. The second liquid suction section 2, the partition section 4 and the first liquid suction section 3 are concentrically laminated on one another in the radial direction.

The length of the first liquid suction section 3 is shorter than the lengths of the second liquid suction section 2 and the partition section 4. Portions of the second liquid suction section 2 and the partition section 4 project from a rear end of the first liquid suction section 3, and front ends of the second liquid suction section 2 and the partition section 4 are aligned with a front end of the first liquid suction section 3.

The partition section 4 and the second liquid suction section 2 are fitted into the first liquid suction section 3. The first liquid suction section 3 is fitted into the contractile tube 5, and the outer peripheral surface of the first liquid suction section 3 is in intimate contact with the contractile tube 5. The length of the contractile tube 5 is shorter than the length of the first liquid suction section 3, and both ends of the first liquid suction section 3 project from the respective ends of the contractile tube 5. The contractile tube 5 is made of a material having heat-shrinkable characteristics, such as polyolefin and polyvinylidene fluoride. The contractile tube 5 heat-shrinks, after heating, and comes into intimate contact with the first liquid suction section 3 without gap. At that time, the contractile tube 5 is not impregnated into a sidewall of the first liquid suction section 3 and liquid does not leak outside from the holes of the first liquid suction section 3.

A front end and a rear end of the first liquid introducing section 7 are opened, an inner diameter of the front end opening is substantially equal to an outer diameter of the first liquid suction section 3, and an inner diameter of the rear end opening thereof is substantially equal to an outer diameter of the partition section 4. A rear end of the first liquid suction section 3 is fitted into the front end opening of the first liquid introducing section 7, and a portion of the contractile tube 5 is also fitted into the front end opening of the first liquid introducing section 7. The second liquid suction section 2 and the partition section 4 are fitted into the first liquid suction section 3. When the first liquid suction section 3 is soft, the first liquid suction section 3 may be shrunk slightly by the contractile tube 5. In this state, the rear end of the first liquid suction section 3 is accommodated in the front end opening of the first liquid introducing section 7. The front end of the first liquid introducing section 7 covers the rear end of the contractile tube 5 such as to be superposed on the rear end of the contractile tube 5 and thus, the first liquid suction section 3 is not exposed. Even when the first liquid suction section 3 is hard and is not easily deformed, since the contractile tube 5 functions as a cushioning material having a sufficient stress, the first liquid introducing section 7 can come into intimate contact with the first liquid suction section 3 excellently.

The second liquid suction section 2 and the partition section 4 are fitted such that they extend from the rear end opening of the first liquid introducing section 7. A rear end surface of the first liquid suction section 3 is separated from a bottom 74 of the rear end of the first liquid introducing section 7, and a ring-like space 71 is formed between the bottom 74 of the first liquid introducing section 7 and the rear end surface of the first liquid suction section 3. The second liquid suction section 2 passes through a center of the space 71, and the second liquid suction section 2 is inserted into the partition section 4. An edge of the rear end opening of the first liquid introducing section 7 is provided with a rubber O-ring 12, and the first liquid introducing section 7 and the partition section 4 are in intimate contact with each other without gap. Therefore, first liquid α charged into the space 71 does not leak from between the first liquid introducing section 7 and the partition section 4.

A first liquid-introducing opening 72 projects from a sidewall of the first liquid introducing section 7. An introducing hole 73 penetrates from a tip end of the first liquid-introducing opening 72 to an inner peripheral surface of the first liquid introducing section 7 along a center axis of the first liquid-introducing opening 72. The introducing hole 73 is in communication with the space 71, and the first liquid α is introduced into the space 71. The first liquid introducing section 7 is not deteriorated or deformed at the boiling point of the first liquid α. The first liquid introducing section 7 is resin, metal or ceramic which does not corrode by contact with the first liquid α. The first liquid-introducing opening 72 is connected to a tube (not shown) through which the first liquid α is sent out.

The second liquid introducing section 13 covers the rear end of the partition section 4 which projects from the first liquid introducing section 7. The second liquid introducing section 13 is a cylindrical tube which surrounds a space 16. A rear end of the second liquid introducing section 13 is provided with a second liquid-introducing opening 15. The second liquid-introducing opening 15 is connected to a tube (not shown) through which second liquid β is sent out. The second liquid β is sucked from the second liquid suction section 2 introduced from the second liquid-introducing opening 15. The second liquid introducing section 13 is connected to or adhered to the partition section 4. It is preferable that coefficients of expansion of the partition section 4 and the second liquid suction section 2 are close to each other. The second liquid introducing section 13 may be fitted into the partition section 4 such that it comes into contact with the first liquid introducing section 7.

The discharging section 8 is integrally formed with a cylindrical accommodating section 81 located in a rearward position, a discharging opening 82 which is connected to the accommodating section 81 and located in a forward position, and a flange 83 projecting from an outer edge of a joint between the accommodating section 81 and the discharging opening 82. A rear end of the accommodating section 81 and a front end of the discharging opening 82 are opened at the discharging section 8. An outer diameter of the discharging opening 82 is smaller than an outer diameter of the accommodating section 81, and an inner diameter of an opening of the discharging opening 82 is smaller than an inner diameter of an opening of the accommodating section 81.

The second liquid suction section 2 and the partition section 4 are inserted into the first liquid suction section 3. A front portion of the first liquid suction section 3 is accommodated in the accommodating section 81 such that the accommodating section 81 is in intimate contact with a sidewall of the front portion of the first liquid suction section 3. At that time, since the rear end of the accommodating section 81 covers the front end of the contractile tube 5 such as to be superposed thereon, the first liquid suction section 3 is not exposed. Even when the first liquid suction section 3 is hard and is not easily deformed, since the contractile tube 5 functions as a cushioning material having a sufficient stress, the discharging section 8 can come into intimate contact with the first liquid suction section 3 excellently.

The discharging section 8 has thermal conductivity as high as 10 $(W \cdot m^{-1} K^{-1})$ or higher, and is made of material which is less prone to corrode or deform with respect to the first liquid α or mixture γ (mixture of gas of second liquid β and gas of first liquid α), and is made of metal such as brass and copper.

The elastomer elastic tube 6 is fitted from a joint between the first liquid introducing section 7 and the contractile tube 5 to a joint between the discharging section 8 and the contractile tube 5. That is, the first liquid suction section 3 is fitted into the accommodating section 81 together with the second liquid suction section 2 and the partition section 4, a portion of the outer peripheral surface of the first liquid suction section 3 projecting from the contractile tube 5 is in contact with the inner surface of the accommodating section 81, a portion of the accommodating section 81 is inserted into the elastic tube 6, and the accommodating section 81 is sandwiched between the inner peripheral surface of the elastic tube 6 and the outer peripheral surface of the first liquid suction section 3. The elastic tube 6 is in intimate contact with the contractile tube 5, the first liquid introducing section 7 and the discharging section 8 without gap.

The length of the elastic tube 6 is shorter than that of the first liquid suction section 3, and a front portion of a sidewall of the accommodating section 81 projects from the elastic tube 6. The contractile tube 5 and the elastic tube 6 may not constitute a double structure. Only one of the contractile tube 5 and the elastic tube 6 may be provided if the first liquid α or gas vaporized from the first liquid α does not leak. If liquid or gas does not seep from the outer peripheral surface of the first liquid suction section 3 by providing the outer peripheral surface of the first liquid suction section 3 with a film or the like, both the contractile tube 5 and elastic tube 6 may be omitted.

Since the contractile tube 5, the elastic tube 6, the first liquid introducing section 7 and the discharging section 8 are formed as tubes as described above, the first liquid suction section 3 and the second liquid suction section 2 are isolated from each other by the partition section 4 and accommodated in the contractile tube 5, the elastic tube 6, the first liquid introducing section 7, the discharging section 8 and the internal space of the second liquid introducing section 13. When the outer peripheral surface of the first liquid suction section 3 is provided with a film through which the first liquid α can not pass instead of the contractile tube 5 and the elastic tube 6, the film, the first liquid introducing section 7 and the discharging section 8 function as tubes for accommodating the first liquid suction section 3, the second liquid suction section 2 and the partition section 4.

Front end surfaces of the second liquid suction section 2, the first liquid suction section 3 and the partition section 4 are separated from a bottom 86 of the discharging section 8, and a space 84 is formed between these end surfaces and the bottom 86 of the discharging section 8. The space 84 is in communication with a discharge hole 82a of the discharging opening 82. The discharging opening 82 is connected to a tube (not shown) through which the mixture γ is sent out.

The heating element 10 which is a heater such as a heating coil is wound around the accommodating section 81 of the discharging section 8, and the heating element 10 and the accommodating section 81 are in contact with each other. Since the heating element 10 is wound around the accommodating section 81, the first liquid suction section 3 is closer to the heating element 10 than the second liquid suction section 2. The heating element 10 is made of electric heating material and is a resistance which generates heat if voltage is applied. A nickel-cobalt wire may be used as the heating element 10 for example. The heating element 10 is coated with heat-resistant adhesive 14 such as ceramic adhesive and epoxy adhesive, and the heating element 10 is fixed to the accommodating section 81 by the adhesive 14. The heating element 10 may be used instead of the ceramic heater, or both the heating element 10 and the ceramic heater may be used.

An insertion hole 85 is formed in the radial direction in the flange 83 of the discharging section 8. The insertion hole 85 is not extended to the accommodating section 81 or the internal space of the discharging opening 82, and a bottom of the insertion hole 85 reaches a portion near an end surface of the second liquid suction section 2. The temperature sensor 11 is inserted into the insertion hole 85, the temperature sensor 11 is located near the end surface of the first liquid suction section 3 and with this, the temperature sensor 11 is embedded in the discharging section 8. The temperature sensor 11 is a thermocouple, a thermistor or a resistance thermometer bulb. The temperature sensor 11 is coated with insulator so that it is insulated from its periphery. The temperature sensor 11 detects a temperature corresponding to heat of the heating element 10 transmitted through the discharging section 8 or adhesive 14.

If the heating element 10 is heated, the first liquid α which penetrates the first liquid suction section 3 by heat propagated to the accommodating section 81 from the heating element 10 is vaporized from the front end surface of the first liquid suction section 3 and is discharged into the space 84. Further, the heat from the heating element 10 is propagated to the second liquid suction section 2 through the partition section 4, the second liquid β which penetrates the second liquid suction section 2 is vaporized from the front end surface of the second liquid suction section 2 and is discharged into the space 84, the second liquid β is mixed with gas vaporized from the first liquid α, the space 84 is filled with the mixture γ, and the mixture γ is discharged from a discharge hole 82a of the discharging opening 82. The space 84 functions as a space in which a plurality of gases are mixed.

Since the second liquid suction section 2 is surrounded by the first liquid suction section 3 and the partition section 4, it is preferable that the heating temperature of the second liquid suction section 2 is set lower than that of the first liquid suction section 3. In this case, it is preferable that the first liquid α which is heated to a higher temperature is material having a boiling point higher than that of the second liquid β which is heated to a lower temperature.

The heat insulation case 9 surrounds a front portions of the heating element 10 and the first liquid suction section 3 and a front portion of the second liquid suction section 2 so that heat of the heating element 10, the front portion of the first liquid suction section 3 and the front portion of the second liquid suction section 2 heated by the heating element 10 are not released outside. The accommodating section 81 and the flange 83 of the discharging section 8 are accommodated in the heat insulation case 9.

If the entire first liquid suction section 3 and the entire second liquid suction section 2 are heated, the first liquid α is vaporized from the rear end surface of the first liquid suction section 3, and the second liquid β is vaporized from the rear end surface of the second liquid suction section 2. These bubbles hinder the penetration of the first liquid α of the first liquid suction section 3 or the penetration of the second liquid β of the second liquid suction section 2, and the amount of mixture γ discharged from the discharging opening 82 becomes instable. Since a rear portion of the first liquid suction section 3 and a rear portion of the second liquid suction section 2 are not covered with the heat insulation case 9, heat of the rear portion of the first liquid suction section 3 and heat of the rear portion of the second liquid suction section 2 are relatively smoothly radiated, the temperature of the rear portion of the first liquid suction section 3 does not reach the boiling point of the first liquid α, and the temperature of the rear portion of the second liquid suction section 2 does not reach the boiling point of the second liquid β.

The heating element 10 heats the front portion of the first liquid suction section 3 to the boiling point of the first liquid α, and heats the front portion of the second liquid suction section 2 to the boiling point of the second liquid β. Therefore, if the first liquid α is vaporized from the front end surface of the first liquid suction section 3, the first liquid α charged into the rear portion of the first liquid suction section 3 is spontaneously moved forward of the first liquid suction section 3 by the capillary action. If the second liquid β is vaporized from the front end surface of the second liquid suction section 2, the second liquid β charged into the rear portion of the second liquid suction section 2 is spontaneously moved forward of the second liquid suction section 2 by the capillary action.

An upper side case 91 and a lower side case 92 are combined to form an accommodation space in the heat insulation case 9. Both the upper case 91 and lower case 92 are made of insulation material such as a ceramic obtained by sintering titanium oxide, potassium oxide, calcium oxide, and engineering plastic such as silicon oxide, PES (sulf-polyether), styrenefoam, urethanefoam.

Fan-like recesses are formed in a lower edge of a front surface of the upper case 91 and an upper edge of a front surface of the lower case 92. If the upper case 91 and the lower case 92 are coupled to each other, these recesses are coupled to each other, and a through hole 93 is formed. The discharging opening 82 of the discharging section 8 is fitted into the through hole 93, and the discharging opening 82 projects from the front surface of the heat insulation case 9. To fix the position, the flange 83 of the discharging section 8 is in contact with an internal surface of the front surface of the heat insulation case 9, but a space may be provided between the flange 83 and the inner surface of the front surface of the heat insulation case 9 to enhance the insulating performance. If a groove is formed in a surface of the flange 83 opposed to the heat insulation case 9, the flange 83 and the heat insulation case 9 abut against each other and the alignment can be carried out, an insulation gap having low thermal conductivity can be formed by this groove, and the insulating effect can be enhanced.

A lower edge of a back surface of the upper case 91 and an upper edge of a back surface of the lower case 92 are formed with fan-like recesses, the upper case 91 and the lower case 92 are coupled to each other, these recesses are coupled to each other, and a through hole 94 is formed. The elastic tube 6, the contractile tube 5, the front portion of the first liquid suction section 3, the partition section 4 and the front portion of the second liquid suction section 2 are fitted into the through hole 94. The elastic tube 6 and a wall surface of the through hole 94 come into intimate contact with each other, and a gap between the wall surface of the through hole 94 and the outer peripheral surface of the first liquid suction section 3 are sealed by the elastic tube 6 and the contractile tube 5.

Wire-through holes 95 to 97 are formed in an upper surface of the upper case 91, and grooves 95a to 97a extending to the back surface of the upper case 91 from the wire-through holes 95 to 97 are formed in an upper surface of the upper case 91. A wire 11a of the temperature sensor 11 is inserted through the wire-through hole 95, the wire 11a is bent and extended in the groove 95a. Similarly, wires 10a and 10b of both ends of the heating element 10 are inserted into wire-through holes 96 and 97, the wires 10a and 10b are bent and extended in the grooves 96a and 96a.

The temperature sensor 11 is connected to a controller 50 through the wire 11a, and the heating element 10 is also connected to the controller 50 through the wires 10a and 10b. A signal indicative of a detection temperature of the temperature sensor 11 is input to the controller 50. The controller 50 controls the heating element 10 so that the temperature of the first liquid suction section 3 and the temperature of the second liquid suction section 2 become equal to desired temperatures based on the detected temperature of the temperature sensor 11. More specifically, when the detected temperature of the temperature sensor 11 becomes higher than an upper threshold value, the controller 50 reduces or turns off electricity supplied to the heating element 10, and when the detected temperature of the temperature sensor 11 becomes lower than a lower threshold value (lower threshold value<upper threshold value), the controller 50 increases or turns on the electricity supplied to the heating element 10, and when the detected temperature of the temperature sensor 11 is higher than the lower threshold value and lower than the upper threshold value, the controller 50 maintains the electricity supplied to the heating element 10.

Next, the operation of the vaporizer 1 and the vaporizing method using the vaporizer 1 will be explained.

If voltage is applied to the heating element 10, the heating element 10 generates heat, and a member accommodated in the heat insulation case 9 is heated. Here, in the inside portion of the heating element 10, as a member is further from the heating element 10, the heating temperature is reduced. Therefore, the temperature of a portion of the first liquid suction section 3 closer to the heating element 10 is higher than the temperature of the further second liquid suction section 2. Rear ends of the first liquid suction section 3 and second liquid suction section 2 are outside of the heat insulation case 9, the front end is in the heat insulation case, and the heating element 10 is wound around the front end. Therefore, the temperature of the first liquid suction section 3 is reduced from the end thereof on the side of the discharging opening 82 toward the end thereof on the side of the first liquid-introducing opening 72, and the temperature of the second liquid suction section 2 is reduced from the end thereof on the side of the discharging opening 82 toward the end thereof on the side of the second liquid-introducing opening 15.

When the detected temperature of the temperature sensor 11 is higher than the lower threshold value and lower than the upper threshold value, the temperature of the first liquid suction section 3 reaches the boiling point of the first liquid α at the end thereof on the side of the discharging opening 82, less than the boiling point of the first liquid α at the end of the first liquid suction section 3 on the side of the first liquid-introducing opening 72, the temperature of the second liquid suction section 2 reaches the boiling point of the sa at the end of the second liquid suction section 2 on the side of the discharging opening 82, and less than the boiling point of the second liquid β at the end of the second liquid suction section 2 on the side of the second liquid-introducing opening 15. In the following description, in the first liquid suction section 3 and the second liquid suction section 2, ends thereof around which the heating element 10 is wound is called a discharging side end, and the other end opposite from the discharging side end is called a suction side end.

In a state where the discharging side ends of the second liquid suction section 2 and the first liquid suction section 3 are heated by the heating element 10, if the second liquid β is sent through the second liquid introducing section 13 by a pump or the like, the second liquid β is sucked into the second liquid suction section 2 from the suction side end of the second liquid suction section 2. The second liquid β sucked into the second liquid suction section 2 moves toward the discharging side end by the capillary action, and the second liquid β is heated by the heating element 10 at the discharging side end of the second liquid suction section 2 and is vaporized. Then, the vaporized gas is perspired into the space 84 in the accommodating section 81 from the end surface of the second liquid suction section 2 on the discharging side. Since the second liquid β is vaporized in the second liquid suction section 2 in this manner, it is possible to suppress the bumping of the second liquid β.

If the first liquid α is supplied into the space 71 in the first liquid introducing section 7 through the introducing hole 73 by a pump or the like, the first liquid α is sucked into the first liquid suction section 3 from the suction side end of the first liquid suction section 3. The first liquid α sucked into the first liquid suction section 3 moves to the discharging side end by the capillary action, the first liquid α is heated by the heating element 10 at the discharging side end of the first liquid suction section 3 and is vaporized. Then, the vaporized gas is perspired into the space 84 in the accommodating section 81 from the end surface of the first liquid suction section 3 on the discharging side. Since the first liquid α is vaporized in the first liquid suction section 3 in this manner, it is possible to suppress the bumping of the first liquid α.

If the boiling point of the first liquid α is higher than the boiling point of the second liquid β, the second liquid β is vaporized at a location close to the end surface on the discharge side of the second liquid suction section 2, and the first liquid α is vaporized at a location close to the end surface of the first liquid suction section 3 on the discharge side. However, if the boiling point of the first liquid α is lower than the boiling point of the second liquid β, and if the temperature is controlled such that the second liquid β is vaporized at a location close to the end surface of the second liquid suction section 2 on the discharge side, the first liquid suction section 3 which is more easily heated by the heating element 10 is excessively heated, the vaporizing region of the first liquid suction section 3 is not only the discharging side end but is expanded to a more rear portion than the discharging side end, and this may cause the bumping of the first liquid α. Therefore, it is preferable that the boiling point of the first liquid α is higher than the boiling point of the second liquid β.

Gas of the second liquid β vaporized in the second liquid suction section 2 is perspired in the space 84 from the discharge side end surface of the second liquid suction section 2, gas of the first liquid α vaporized in the first liquid suction section 3 is perspired in the space 84 from the discharge side end surface of the first liquid suction section 3, and these gases are mixed. This mixture γ is discharged out through the discharge hole 82a.

When liquid is being vaporized in this manner, since the controller 50 feedback controls the heating element 10 based on the detected temperature of the temperature sensor 11, the temperature of the discharging side end of the first liquid suction section 3, the vaporizing region of the first liquid α of the first liquid suction section 3, the temperature of the discharging side end of the second liquid suction section 2, and the vaporizing region of the second liquid β of the second liquid suction section 2 are controlled such that they fall within desired values and desired range, respectively.

According to the exemplary example, the second liquid suction section 2 and the first liquid suction section 3 are concentrically laminated on each other, and the second liquid suction section 2 and the first liquid suction section 3 are partitioned by the partition section 4. Therefore, in the second liquid suction section 2 and the first liquid suction section 3, the second liquid β and first liquid α are not mixed in the liquid state. Thus, different kinds of liquid are sucked in different regions. For this reason, since it is possible to separately vaporize two kinds of liquid having different boiling points, the two kinds of liquid can stably be vaporized. Since gases stable generated separately are mixed in the space 84, the mixture is sent downstream through the discharge hole 82a. Thus, the mixture is sent downstream through the discharge hole 82a at a stable flow rate. Especially, when the first liquid α is water and second liquid β is methanol, a water vapor reforming device is disposed downstream, and hydrogen can be generated.

Conventionally, if liquids having different boiling points are heated to different temperatures using different heating means, there is a problem that the vaporizer itself is increased in size. According to the vaporizer 1, since two kinds of liquid can separately be vaporized using one heating means (heating element 10), it is unnecessary to prepare two heating means or vaporizers for vaporizing two kinds of liquid, and it is unnecessary to separately control using two temperature sensors. Therefore, space can be saved, the circuit can be simplified, and cost thereof can be reduced.

The second liquid suction section 2 is fitted into the first liquid suction section 3, and the heating element 10 is wound around the first liquid suction section 3. Therefore, such a temperature distribution that the temperature is increased from the center axis to radially outward is generated. Further, since the second liquid β having low boiling point is sucked into the second liquid suction section 2 and vaporized, the first liquid α having high boiling point is sucked into the first liquid suction section 3 and vaporized and thus, the utility efficiency of energy is enhanced, and the second liquid β and first liquid α can efficiently be vaporized.

The shape of the heating element 10 is not limited to the coil shape, and if the heating element 10 is disposed on the side surface of the discharging section 8, the heating element 10 may be a thin film heat-generating resistant layer. The heat-generating resistant layer may be a metal oxide or gold (Au). Since the resistivity of gold is varied in accordance with temperature, the heat-generating resistant layer can also function as a temperature sensor. Thus, the temperature sensor 11 becomes unnecessary, and the wire structure can be simplified.

If the discharging section 8 is a conductive section, the discharging section 8 may be coated with an insulative film, and the insulative film may be covered with the heat-generating resistant layer. At that time, if the heat-generating resistant layer is gold, a backing layer such as titanium (Ti) and tantalum (Ta) for enhancing the adhesion with respect to the insulative film, and a heat dispersion preventing layer comprising metal having high melting point such as tungsten for preventing gold from dispersing heat may be laminated between the insulative film and the heat-generating resistant layer in this order.

The second liquid suction section 2, the discharging side end of the first liquid suction section 3, the accommodating section 81 and the flange 83 of the discharging section 8, and the heating element 10 are accommodated in the heat insulation case 9. Therefore, the heat loss is small, and heat energy of the heating element 10 is effectively utilized for vaporizing liquid. Since the suction side ends of the second liquid suction section 2 and the first liquid suction section 3 are located outside of the heat insulation case 9, a temperature gradient is generated from the suction side end to the discharging side end of the second liquid suction section 2, and the temperature of the suction side end of the second liquid suction section 2 becomes lower than the temperature of the discharging side end thereof. Therefore, the second liquid β sucked by the second liquid suction section 2 is not vaporized at a location close to the sucking side end surface, and it is possible to prevent gas in the second liquid suction section 2 from being discharged only from the sucking side end surface, i.e., to prevent gas from flowing reversely. The first liquid α sucked by the first liquid suction section 3 is not vaporized at a location close to the sucking side end surface, and it is possible to prevent gas from flowing reversely.

Since the temperature sensor 11 is embedded in the discharging section 8, it is possible to precisely measure the temperature near the discharge side end surface of the first liquid suction section 3 and the temperature near the discharge side end surface of the second liquid suction section 2. Further, since the temperature is controlled by the controller 50 based on the precise detected temperature, it is possible to maintain the temperature near the discharge side end surface of the first liquid suction section 3 and the temperature near the discharge side end surface of the second liquid suction section 2 within desired temperature ranges, and it is possible to vaporize stably. Since the heat insulation case 9 can be divided vertically into the upper case 91 and the lower case 92, it is possible to operate while visually checking, and the assembling operability of the vaporizer 1 is enhanced.

If the contractile tube 5 is heated, it is shrunk. Therefore, the adhesion between the outer peripheral surface of the first liquid suction section 3 and the inner peripheral surface of the contractile tube 5 is enhanced. Thus, the first liquid α or gas of the first liquid α does not leak from the outer peripheral surface of the first liquid suction section 3.

Although the second liquid suction section 2 and the first liquid suction section 3 are of the concentric double structure in the exemplary example, a concentric triple structure may by employed by providing additional cylindrical liquid sucking section outside of the first liquid suction section 3 and by providing the partition section between the cylindrical liquid sucking section and the first liquid suction section 3. Further, a concentric multi-layer structure may be employed by providing more liquid sucking sections. In this case, it is preferable that liquid having higher boiling point is supplied to the sucking side end surface of an outer liquid sucking section of the plurality of liquid sucking sections, i.e., to the sucking side end surface of a liquid sucking section closer to the heating element 10, and 111 having higher boiling point is sucked into an outer liquid sucking section, i.e., a liquid sucking section further from the heating element 10.

The second liquid suction section 2 may be divided in a circumferential direction, a partition wall may be interposed between the divided fan-like liquid sucking sections, the partition wall may project from an inner surface of a back surface of the first liquid introducing section 7, the space 71 may be partitioned into a plurality of fan-like spaces by the partition wall, and an introducing hole which is in communication with each fan-like space may be formed in the outer peripheral surface of the first liquid introducing section 7.

The second liquid suction section 2 may be divided into a plurality of liquid sucking sections by a partition wall.

Second Exemplary Example

Figure 3:
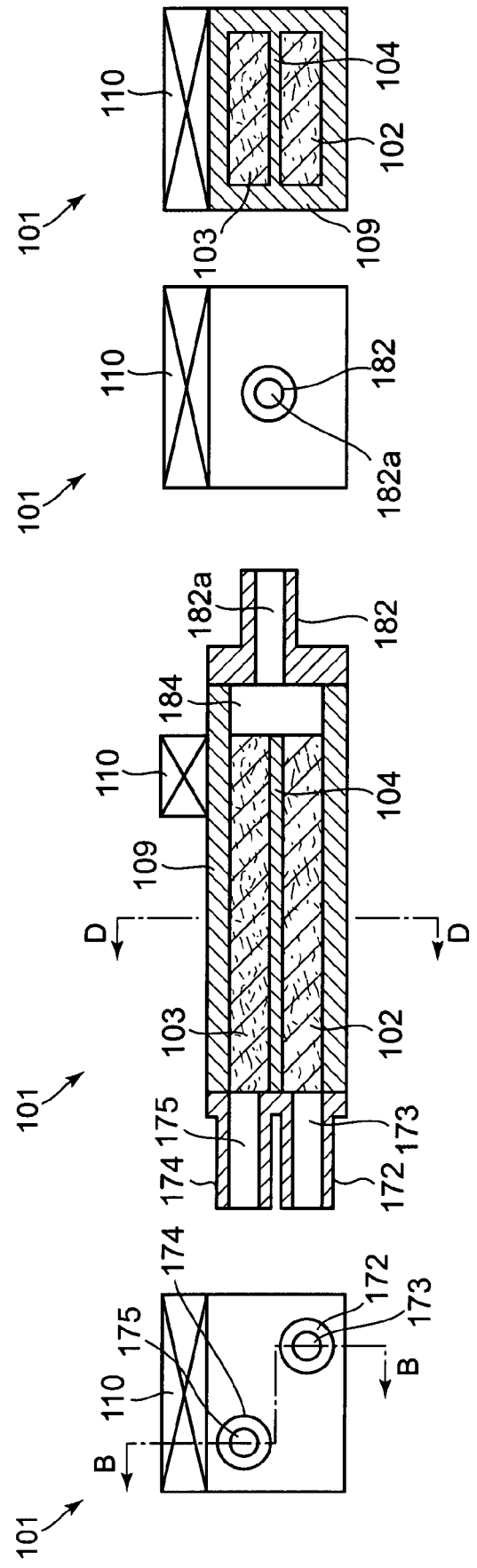
FIG. 3A is a rear view of a vaporizer of a second exemplary example.
FIG. 3B is a sectional view taken along the line B-B in FIG. 3A.
FIG. 3C is a front view of the vaporizer of the second exemplary example.
FIG. 3D is a sectional view taken along the line D-D in FIG. 3B.

FIG. 3A is a rear view of a vaporizer 101, FIG. 3B is a sectional view taken along the cut line B-B in FIG. 3A, FIG. 3C is a front view of the vaporizer 101, and FIG. 3D is a sectional view taken along the cut line D-D shown in FIG. 3B.

As shown in FIGS. 3A to 3D, a body tube 109 is formed into a prismatic tube, a back surface opening and a front surface opening of the body tube 109 are closed, and an internal space is formed in the body tube 109. A partition wall 104 is formed inside of the body tube 109. The partition wall 104 is in parallel to an upper surface and a lower surface of the body tube 109. The internal space of the body tube 109 is partitioned by the partition wall 104 into vertical two spaces extending from front to rear of the body tube 109. The partition wall 104 is connected to a rear end surface, and inner sides of left and right side surfaces of the body tube 109, and is not connected to an inner side of the front end surface of the body tube 109. Therefore, the upper space and lower space in the body tube 109 are in communication with each other at a location close to the front surface, and a space at a location where the upper and lower spaces are connected is designated with a symbol 184.

The body tube 109 is provided at its back surface with a second liquid-introducing opening 172 into which the second liquid β is introduced, and a first liquid-introducing opening 174 into which the first liquid α is introduced. The second liquid-introducing opening 172 and the first liquid-introducing opening 174 project from the body tube 109. An introducing hole 173 is formed along the center axis of the second liquid-introducing opening 172 from a tip end of the second liquid-introducing opening 172 to an inner surface of the body tube 109, and the introducing hole 173 is in communication with a lower space in the body tube 109. An introducing hole 175 is formed along the center axis of the first liquid-introducing opening 174 from a tip end of the first liquid-introducing opening 174 to an inner surface of the body tube 109, and the introducing hole 175 is in communication with the upper space in the body tube 109.

A second liquid suction section 102 is charged into the lower space in the body tube 109, a first liquid suction section 103 is charged into the upper space, and the second liquid suction section 102 and the first liquid suction section 103 are laminated on each other in the thickness direction with the partition wall 104 interposed therebetween. The first liquid suction section 103 and the second liquid suction section 102 are prismatic core members. The second liquid suction section 102 and the first liquid suction section 103 are porous bodies formed with fine spaces therein like the first liquid suction section 3 and the second liquid suction section 2 of the first exemplary example, and the second liquid suction section 102 and the first liquid suction section 103 can suck liquid.

A rear end surface of the second liquid suction section 102 (this end surface is called sucking side end surface hereinafter) faces the introducing hole 173, and a front end surface of the second liquid suction section 102 (this end surface is called discharge side end surface hereinafter) faces the space 184. A rear end surface of the first liquid suction section 103 (this end surface is called sucking side end surface hereinafter) faces the introducing hole 175, and a front end surface of the first liquid suction section 103 (this end surface is called discharge side end surface hereinafter) faces the space 184.

A heating element 110 is placed on an upper surface of the body tube 109. The heating element 110 is placed on the body tube 109 of the first liquid suction section 103 on the side of the discharging side end. Therefore, the temperatures of the liquid suction sections 102 and 103 are gradually increased from the suction side end toward the discharging side end. The first liquid suction section 103 is closer to the heating element 110 than the second liquid suction section 102. The temperature of the discharging side end of the first liquid suction section 3 is higher than that of the discharging side end of the second liquid suction section 2.

The body tube 109, the first liquid-introducing opening 174, the second liquid-introducing opening 172 and the discharging opening 182 are made of metal (e.g., stainless steel (SUS316)).

Next, the operation of the vaporizer 101 and the vaporizing method using the vaporizer 101 will be explained.

If the first liquid α is sent to the introducing hole 175 of the first liquid-introducing opening 174 by a pump or the like in a state where the discharging side ends of the first liquid suction section 103 and the second liquid suction section 102 are heated by the heating element 110, the first liquid α is sucked into the first liquid suction section 103 from the sucking side end surface of the first liquid suction section 103. The first liquid α which penetrates the discharging side end of the first liquid suction section 103 is vaporized by heat of the heating element 110. The vaporized gas is perspired into the space 184 from the discharge side end surface of the first liquid suction section 103.

The first liquid suction section 103 is closer to the heating element 110 than the second liquid suction section 102, and is interposed between the second liquid suction section 102 and the heating element 110. Therefore, the heating temperature of the heating element 110 is higher at the discharging side end of the first liquid suction section 103 than the discharging side end of the second liquid suction section 102. Therefore, it is preferable that the boiling point of the first liquid α is higher than the boiling point of the second liquid β.

If the second liquid β is sent to the introducing hole 173 of the second liquid-introducing opening 172, the second liquid β is sucked into the second liquid suction section 102 from the sucking side end surface of the second liquid suction section 102. The second liquid β which penetrates the discharging side end of the second liquid suction section 102 is vaporized by heat of the heating element 110 through the first liquid suction section 103. The vaporized gas is perspired into the space 184 from the discharge side end surface of the second liquid suction section 102.

The gas of the second liquid β perspired into the space 184 from the discharge side end surface of the second liquid suction section 102 and the gas of the first liquid α perspired into the space 184 from the discharge side end surface of the first liquid suction section 103 are mixed in the space 184. This mixture is discharged out through the discharge hole 182a.

According to the exemplary example, the second liquid suction section 102 and the first liquid suction section 103 are laminated on each other with the partition wall 104 interposed therebetween. Therefore, the second liquid suction section 102 and the first liquid suction section 103 can independently absorb liquid. Since two kinds of liquid having different boiling points can be vaporized independently, the liquid can be vaporized stably. Since the two kinds of liquid can independently be vaporized using one vaporizer 101, it is unnecessary to prepare two vaporizers for vaporizing two kinds of liquid. Therefore, space can be saved as a whole, and cost thereof can be reduced.

The first liquid α having the higher boiling point is sucked by the end of the first liquid suction section 103 having the higher heating temperature and is vaporized, and the second liquid β having the lower boiling point is vaporized at the end of the second liquid suction section 102 having the lower heating temperature. Therefore, the utilizing efficiency of energy is enhanced, and the first liquid α and second liquid β can efficiently be vaporized.

The exemplary example employs the double structure in which the partition wall 104 is interposed between the first liquid suction section 103 and the second liquid suction section 102, and the second liquid suction section 102 and the first liquid suction section 103 are superposed on each other. It is also possible to employ such a structure that more partition walls are provided in the body tube 109, the space in the body tube 109 is divided into many spaces from the sucking side end surface to the discharge side end surface of the body tube 109, and liquid sucking sections are charged into the respective spaces. In this case, the front end of each partitioning material is separated from the inner side of the front surface of the body tube 109 so that the vertically divided plurality of spaces are connected to each other through the space 184, and introducing holes which are in communication with the vertically divided many spaces are formed in the rear end surface of the body tube 109. It is preferable that liquid having higher boiling point is supplied to a sucking side end surface of a liquid sucking section located closer to the heating element 110, and liquid having higher boiling point is sucked as approaching the heating element 110.

The space in the body tube 109 is vertically divided by the partition wall 104. In addition to this, partition walls which are in parallel to left and right side surfaces of the body tube 109 may be disposed in the body tube 109, and the space in the body tube 109 may be divided vertically and laterally. In this case, the front end of each partitioning material tries to separate from the inner side of the front surface of the body tube 109, the spaces divided into four vertically and laterally are in communication with each other through the space 184, and the introducing holes which are in communication with the spaces vertically and laterally divided are formed in the back surface of the body tube 109.

When the boiling point of the second liquid β sucked by the second liquid suction section 102 is higher than the boiling point of the first liquid α sucked by the first liquid suction section 103, the heating element 110 is provided on the lower surface of the body tube 109.

The body tube 109 has thermal conductivity as high as 10 (W·m$^{-1}$K$^{-1}$) or higher, and is made of material which is less prone to corrode or deform with respect to the first liquid α or mixture γ (mixture of gas of second liquid β and gas of first liquid α), and is made of metal such as brass and copper.

The shape of the heating element 110 is not limited to the coil shape. If the heating element 110 is disposed on the side surface of the body tube 109, the heating element 110 may be a thin film heat-generating resistant layer. The heat-generating resistant layer may be made of metal oxide or gold (Au). Since the resistivity of gold is varied in accordance with temperature, the heat-generating resistant layer can also function as a temperature sensor. Thus, the temperature sensor becomes unnecessary, and the wire structure can be simplified.

If the body tube 109 is a conductive section, the body tube 109 may be coated with an insulative film, and the insulative film may be covered with the heat-generating resistant layer. At that time, if the heat-generating resistant layer is gold, a backing layer such as titanium (Ti) and tantalum (Ta) for enhancing the adhesion with respect to the insulative film, and a heat dispersion preventing layer comprising metal having high melting point such as tungsten for preventing gold from dispersing heat may be laminated between the insulative film and the heat-generating resistant layer in this order.

[Example of Application]

Figure 4:
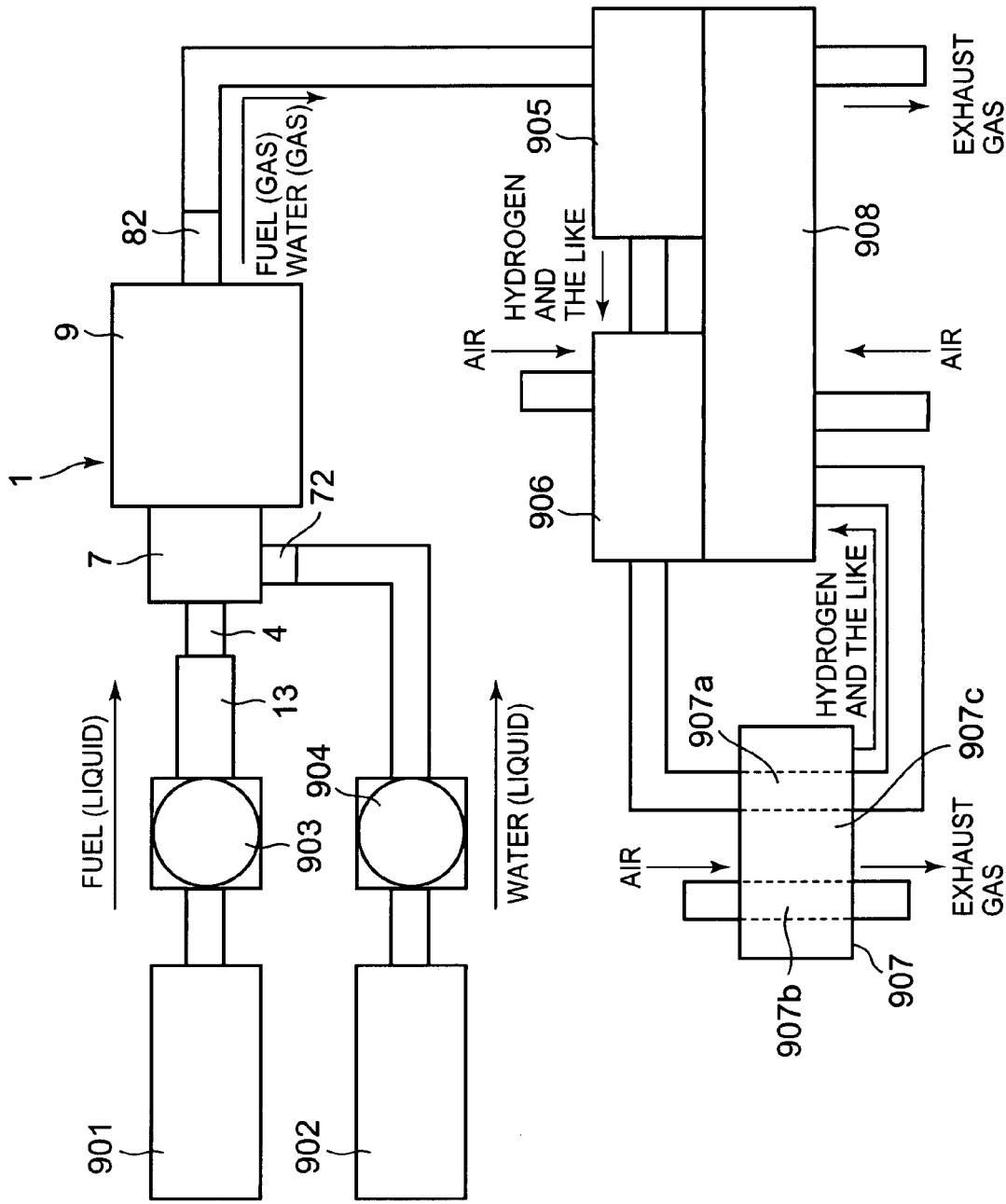
FIG. 4 is a block diagram of the vaporizer illustrated together with a cartridge, pump, a reforming device, a carbon monoxide eliminating device, a fuel cell and a combustor.

FIG. 4 is a block diagram showing the vaporizer 1 together with cartridges 901 and 902, pumps 903 and 904, a reforming device 905, a carbon monoxide eliminating device 906, a fuel cell 907 and a combustor 908.

The first liquid-introducing opening 72 is connected to the pump 904, and the pump 904 is connected to the cartridge 902. Water (boiling point: 100° C.) is stored in the cartridge 902, and the water is sent to the first liquid-introducing opening 72 by the pump 904. A syringe pump or an electro-osmotic pump may be used as the pump 904.

The pump 903 is connected to the second liquid introducing section 13, and the pump 903 is connected to the cartridge 901. Liquid fuel (e.g., methanol (boiling point is 65° C.) or ethanol (boiling point is 78.3° C.) having boiling point lower than that of water is stored in the cartridge 901, and the liquid fuel is sent to the partition section 4 by the pump 903. A syringe pump or an electro-osmotic pump may be used as the pump 903.

The reforming device 905 is connected to the discharging opening 82 of the discharging section 8, and a mixture of fuel and water discharged from the vaporizer 1 is supplied to the reforming device 905.

The reforming device 905 make the fuel and water supplied from the vaporizer 1 react with each other by catalysis, thereby producing hydrogen gas and the like. In the reforming device 905, a very small quantity of carbon monoxide is also produced. When the liquid fuel stored in the cartridge 901 is methanol, reaction as shown in the following equations (1) and (2) occurs in the reforming device 905.

$$CH_3OH + H_2O \rightarrow 3H_2 + CO_2 \quad (1)$$

$$2CH_3OH + H_2O \rightarrow 5H_2 + CO + CO_2 \quad (2)$$

The mixture in a product produced by the reforming device 905 is supplied to the carbon monoxide eliminating device 906, and air is supplied to the carbon monoxide eliminating device 906 by an air pump. In the carbon monoxide eliminating device 906, carbon monoxide in the mixture is selected by a catalyst, the carbon monoxide is subject to oxidation with higher priority, and hydrogen is not subject to oxidation.

The fuel cell 907 includes a fuel pole 907a carrying catalyst fine particles, an air pole 907b carrying catalyst fine particles, and an electrolyte film 907c interposed between the fuel pole 907a and the air pole 907b. A mixture is supplied to the fuel pole 907a from the carbon monoxide eliminating device 906, and air is supplied to the air pole 907b by an air pump. Ion is produced by one of the fuel pole 907a and the air pole 907b, the ion penetrates the electrolyte film 907c, water is produced by the other pole and with this, electricity is generated between the fuel pole 907a and the air pole 907b. When a hydrogen ion can penetrate the electrolyte film 907c (e.g., a solid high polymer electrolyte film), a reaction as shown in the following equation (3) occurs in the fuel pole 907a, and a reaction as show in the following equation (4) occurs in the air pole 907b.

$$H_2 \rightarrow 2H^+ + 2e^- \tag{3}$$

$$2H^+ + \tfrac{1}{2}O_2 + 2e^- \rightarrow H_2O \tag{4}$$

Offgas including excessive hydrogen gas which does not react by the fuel pole 907a is supplied to the combustor 908, and air is supplied to the combustor 908 by the air pump. In the combustor 908, oxygen in the air and unreacted hydrogen react with each other through a catalyst, and combustion heat is generated. The combustion heat is used for reaction between the reforming device 905 and the carbon monoxide eliminating device 906.

The entire system shown in FIG. 4 is provided in electronic equipment such as a notebook personal computer, a PDA, an electronic notepad, a digital camera, a cellular phone, a watch, a register and a projector. The fuel cell 907 is used as a power supply of the electronic equipment.

When the vaporizer 101 shown in FIGS. 3A to 3D is applied to the system shown in FIG. 4, the first liquid-introducing opening 174 is connected to the pump 904, the second liquid-introducing opening 172 is connected to the pump 903, water is supplied from the cartridge 902 to the first liquid-introducing opening 174, and liquid fuel is supplied from the cartridge 901 to the second liquid-introducing opening 172.

When the boiling point of the fuel is higher than that of water, fuel is introduced into the first liquid-introducing opening 72 and water is introduced into the second liquid introducing section 13.

Embodiment 1

Figure 5:
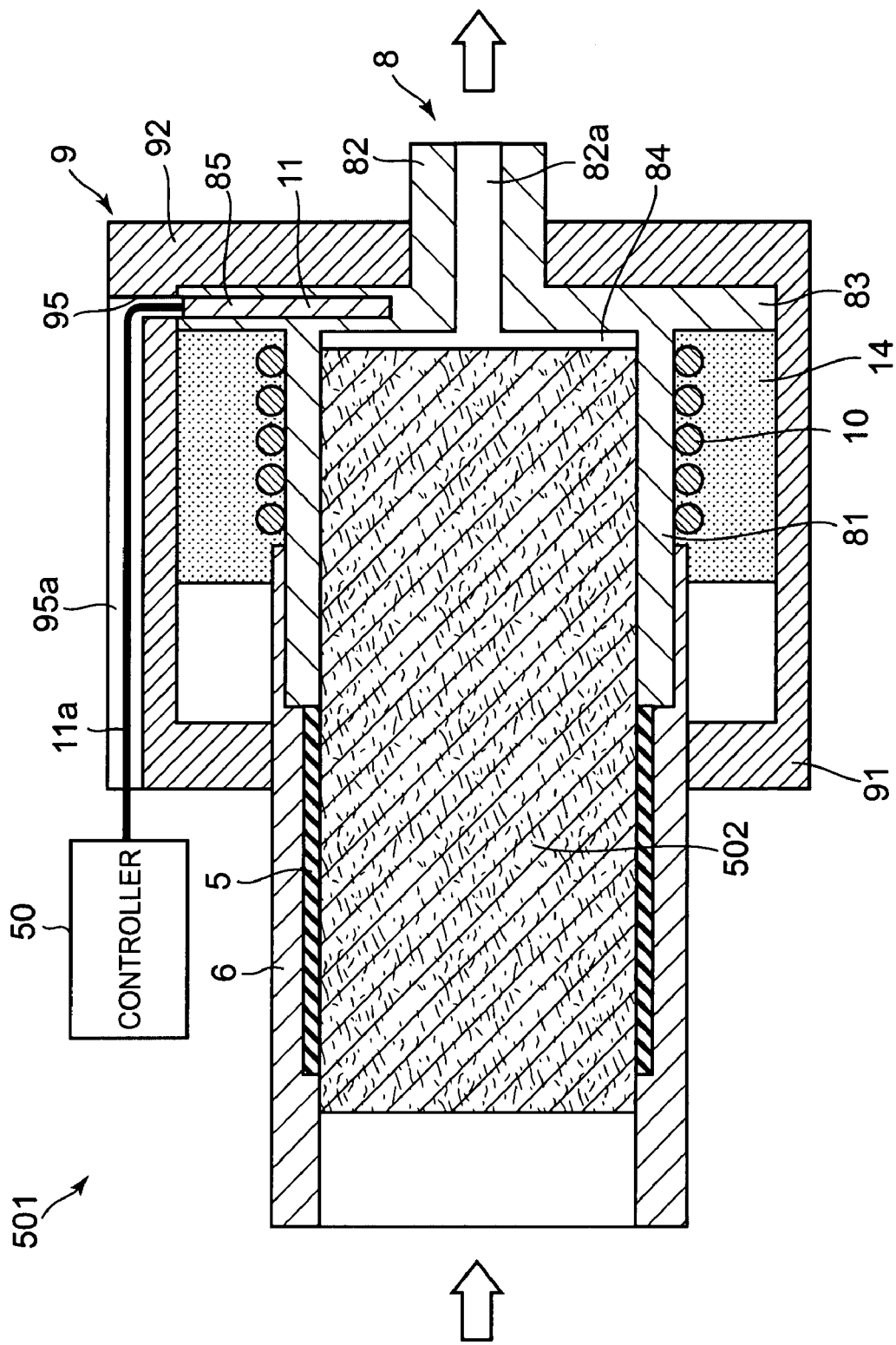
FIG. 5 is a sectional view of a vaporizer used in an experiment.

Experiments were conducted. In the experiments, a vaporizer 501 as shown in FIG. 5 was used as a comparative example. In the vaporizer 501, the integral member comprising the partition section 4, the first liquid suction section 3 and the second liquid suction section 2 shown in FIG. 1 is replaced by one cylindrical liquid suction section 502, the elastic tube 6 is elongated, and the first liquid introducing section 7 is removed. Except these points, the vaporizer 501 is the same as the vaporizer 1, a pump is connected to a flow rate meter, the flow rate meter is connected to the elastic tube 6, and the discharge hole 82a of the discharging opening 82 is opened. Conditions of the liquid suction section 502 are as follows:

(a) The liquid suction section 502 (columnar body): a pore ratio is 41%, a particle diameter is 3 µm, a diameter is 1.5 mm, a length is 10.0 mm, and 2 mm of tip end is heated to 130° C. by the heating element 10 through the accommodating section 81, and (b) The discharging section 8: a material is brass, and an inner diameter of the discharge hole 82a is 0.5 mm.

Figure 6:
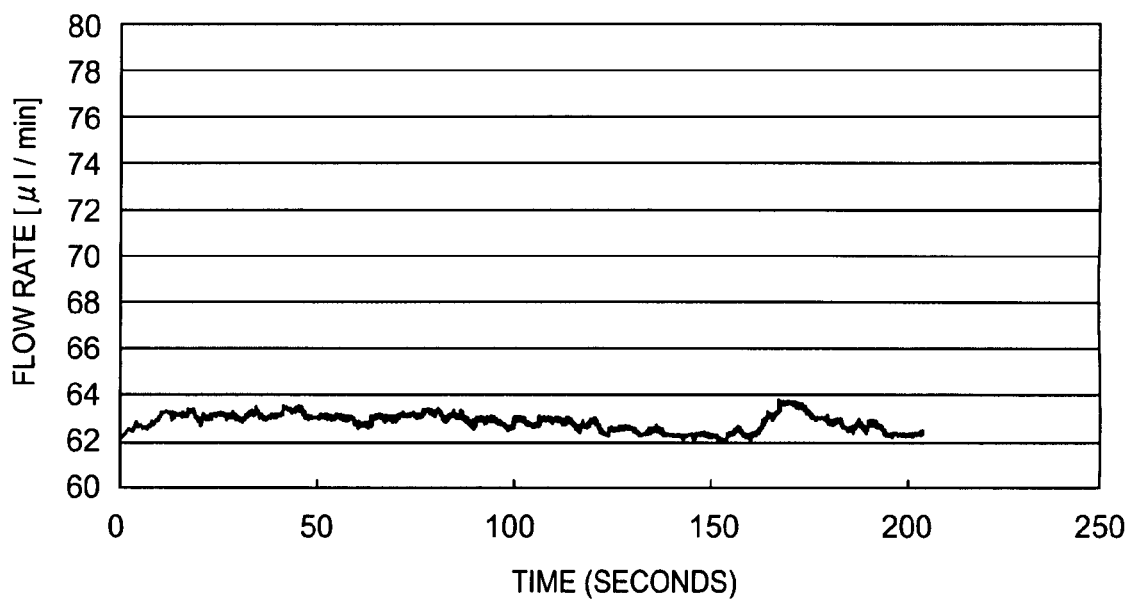
FIG. 6 is a graph showing a result of measurement of a flow rate of a methanol water solution when the methanol water solution is supplied to the vaporizer by a pump.

In a state where the heating element 10 was not heated, 60 wt % of methanol water solution was sent to the elastic tube 6 through a flow rate meter by a pump (electro-osmotic pump), and the flow rate of the methanol water solution was measured by the flow rate meter. A result of measurement of the flow rate is shown in FIG. 6. A set value of the flow rate of the pump was 60 µl/min.

Figure 7:
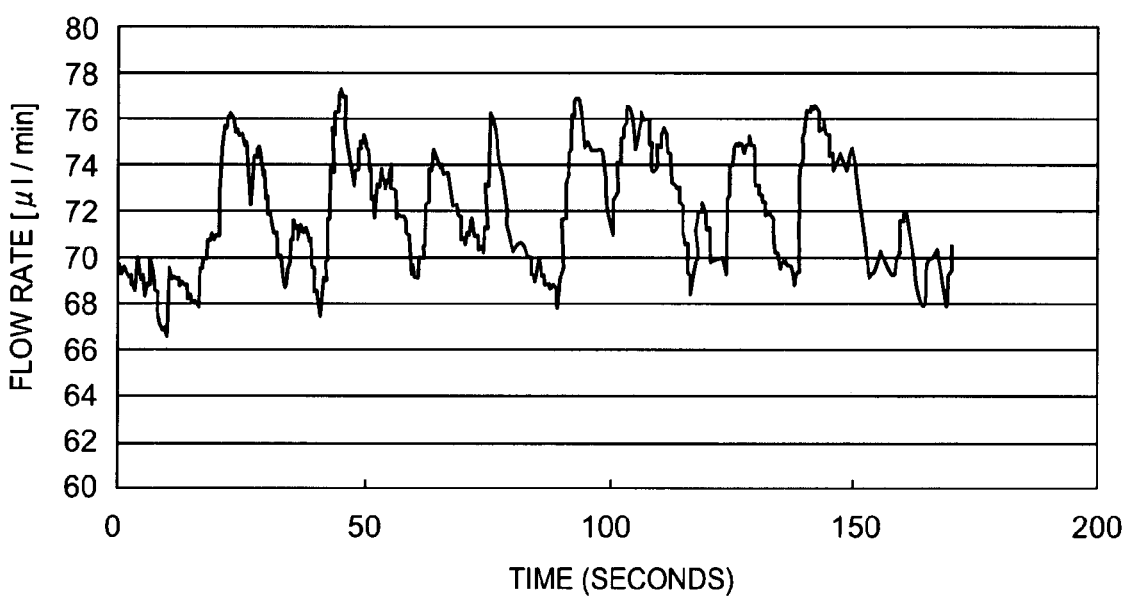
FIG. 7 is a graph showing a result of measurement of a flow rate of a methanol water solution when the methanol water solution is supplied to the vaporizer by a pump.

In a state where the heating element 10 was heated to 130° C., 60 wt % of methanol water solution was sent to the elastic tube 6 through the flow rate meter by the pump (electro-osmotic pump), and the flow rate of the methanol water solution was measured by the flow rate meter. A result of measurement of the flow rate is shown in FIG. 7. As apparent from FIG. 7, in the case of the methanol water solution having no azeotrope point, peaks of the flow rate were generated frequently for a short time, and pulsation was generated in the methanol water solution. Further, variation in the flow rate was also large. One cycle of pulsation is time from a peak of the flow rate to a next peak of the flow rate in FIG. 7. Variation in flow rate of about 10 µl/min was found in a short term at the maximum.

Figure 8:
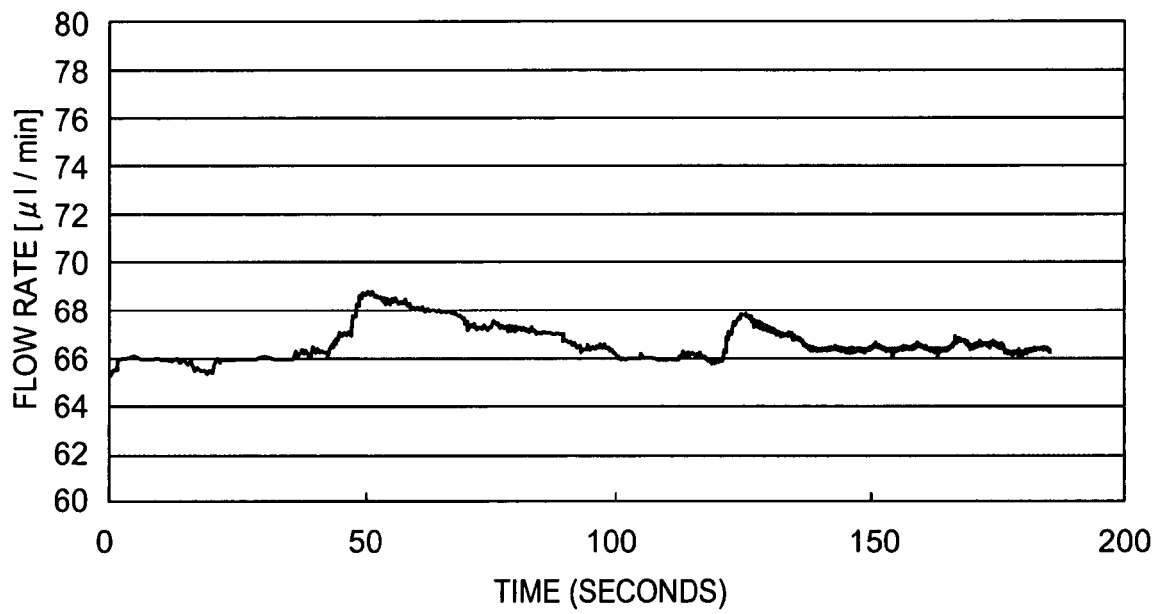
FIG. 8 is a graph showing a result of measurement of a flow rate of pure water when the pure water is supplied by a pump.
Figure 9:
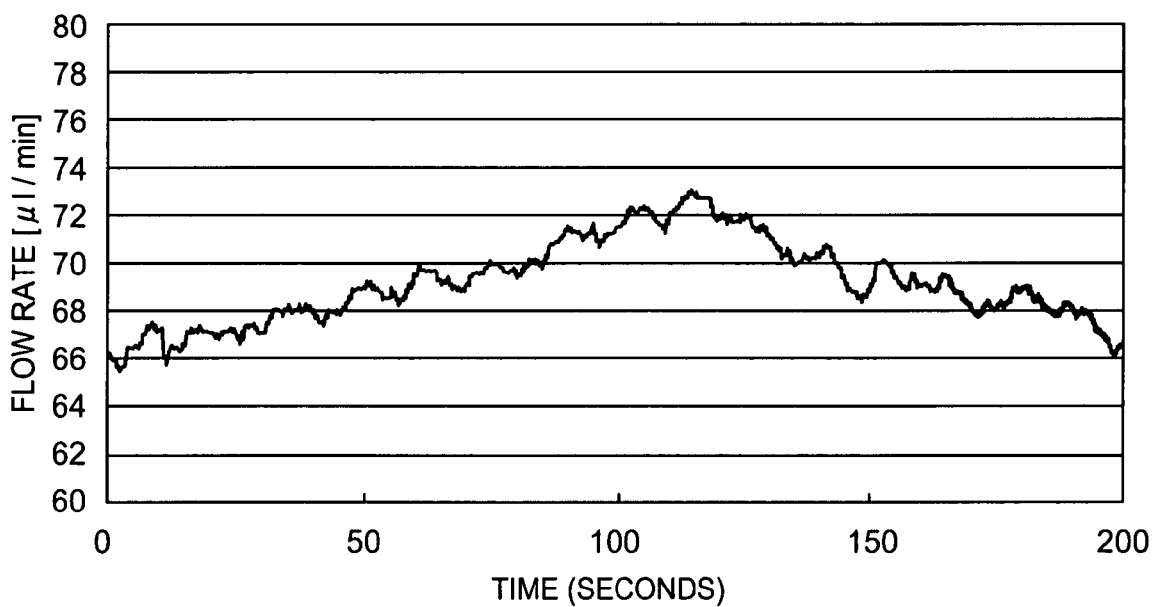
FIG. 9 is a graph showing a result of measurement of a flow rate of pure water when the pure water is supplied by a pump.

In the vaporizer 1 having the structure shown in FIG. 1, in a state where the heating element 10 was heated to 130° C., a liquid-sending amount when pure water was sent to the first liquid introducing section 7 by a pump (electro-osmotic pump) and a liquid-sending amount when methanol was sent to the second liquid introducing section 13 by a pump (syringe pump) are shown in FIGS. 8 and 9, respectively. Conditions of the vaporizer 1 are set as follows:

(a) Second liquid suction section 2 (columnar body): a pore ration is 41%, a diameter is 1.5 mm, and a length 20.0 mm, (b) Partition section 4 (cylindrical tube): a material is SUS316, an inner diameter is 1.5 mm, a thickness is 0.1 mm, and a length is 20.0 mm, (c) First liquid suction section 3 (cylindrical body): a pore ratio is 41%, an outer diameter is 2.3 mm, a length is 10.0 mm, and 2 mm of tip end is heated to 130° C. by the heating element 10 through the accommodating section 81, and (d) Discharging section 8: brass, a diameter of discharge hole 82a is mm.

As apparent from FIG. 8, since there is only pure water in the first liquid suction section 3, the flow rate is not abruptly varied and liquid can be sent stably.

As apparent from FIG. 9, since there is only methanol in the second liquid suction section 2, the flow rate is not abruptly varied and liquid can be sent stably.

In FIG. 9, the reason why the flow rate was increased gradually from 0 second to 110 seconds was due to characteristics of the syringe pump.

As can be found from the above experiments, if the methanol water solution having no azeotrope boiling point was vaporized, a large pulsation was generated, but no large pulsation was generated in the case of water alone and methanol alone. Therefore, if two kinds of liquid are supplied to the vaporizer 1 and the vaporizer 101 and vaporized independently like the vaporizer 1 and vaporizer 101 of the above exemplary example, two kinds of liquid can stably be vaporized.

Figure 10:
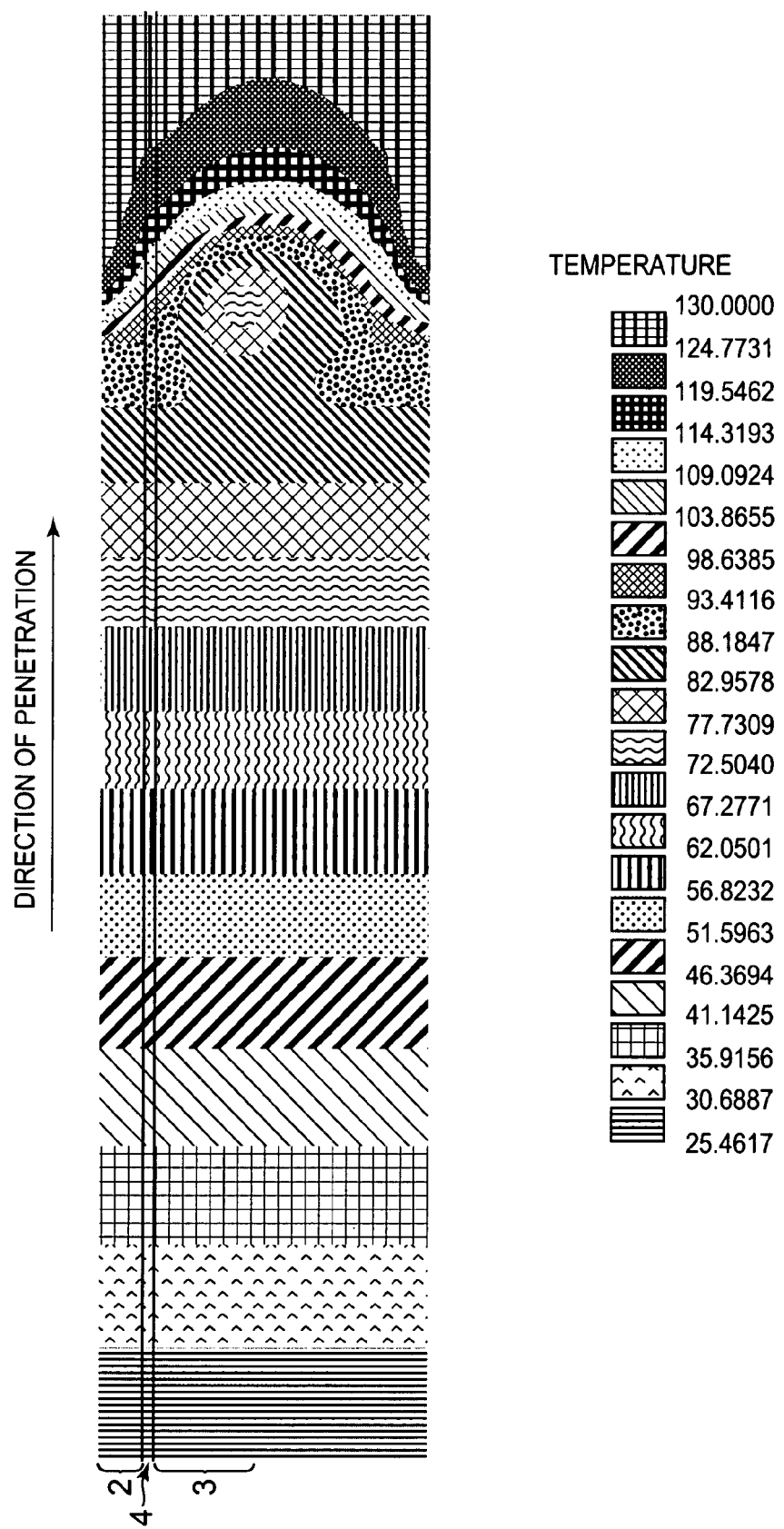
FIG. 10 is a diagram showing data indicating temperature gradient of a vaporizer which supplies water to a first liquid sucking section and methanol to a second liquid sucking section.

FIG. 10 shows data of a temperature gradient when water having relatively high boiling point was supplied to the first liquid suction section 3 and methanol having relatively low boiling point was supplied to the second liquid suction section 2 in a state where the heating element 10 was heated to 130° C. in the vaporizer 1. It can be found that since the discharging side ends of the first liquid suction section 3 and the second liquid suction section 2 are relatively equally heated, temperatures of both liquids reach the boiling points in a wide range and water and methanol can be vaporized excellently.

Figure 11:
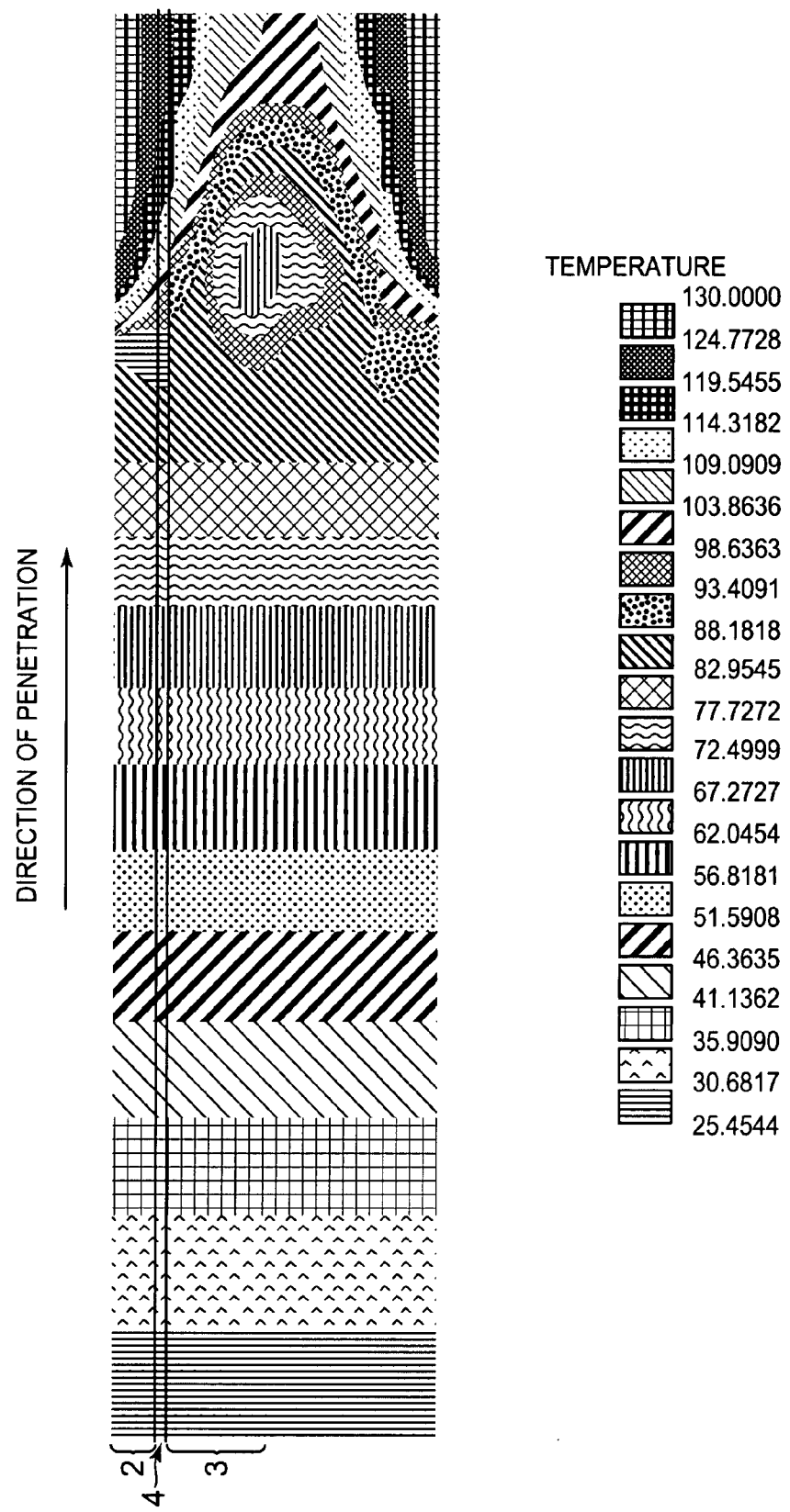
FIG. 11 is a diagram showing data indicating temperature gradient of a vaporizer which supplies methanol to a first liquid sucking section and water to a second liquid sucking section.

FIG. 11 shows data of a temperature gradient when methanol having relatively low boiling point was supplied to the first liquid suction section 3, and water having relatively high boiling point was supplied to the second liquid suction section 2 in a state where the heating element 10 was heated to 130° C. in the vaporizer 1. In the first liquid suction section 3, methanol is vaporized excessively largely beyond the boiling point, but at the discharging side end of the second liquid suction section 2, sufficient heat is not transferred due to an endothermic phenomenon caused by vaporization of methanol in the first liquid suction section 3, a region where the temperature reaches the boiling point of water is small, and the vaporization amount of water is not enough.

Another exemplary example for carrying out the present invention will be explained using drawings. Although various limitations which are preferable for carrying out the invention are proposed in the following exemplary examples, the scopes of the invention are not limited to the exemplary examples and illustrated examples.

Figure 12:
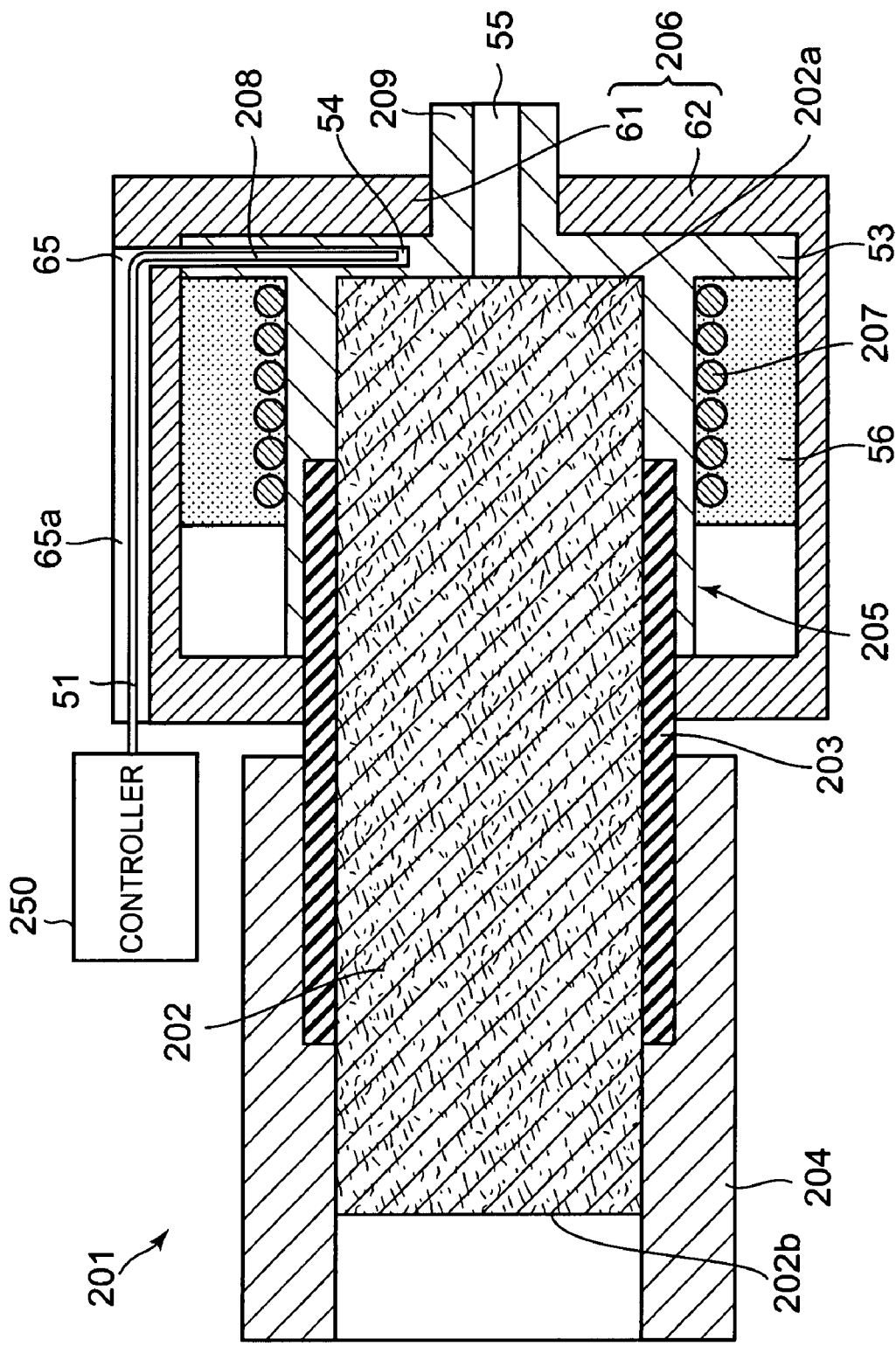
FIG. 12 is a sectional view of the vaporizer in a vertical section taken along the center line of a liquid sucking section.
Figure 13:
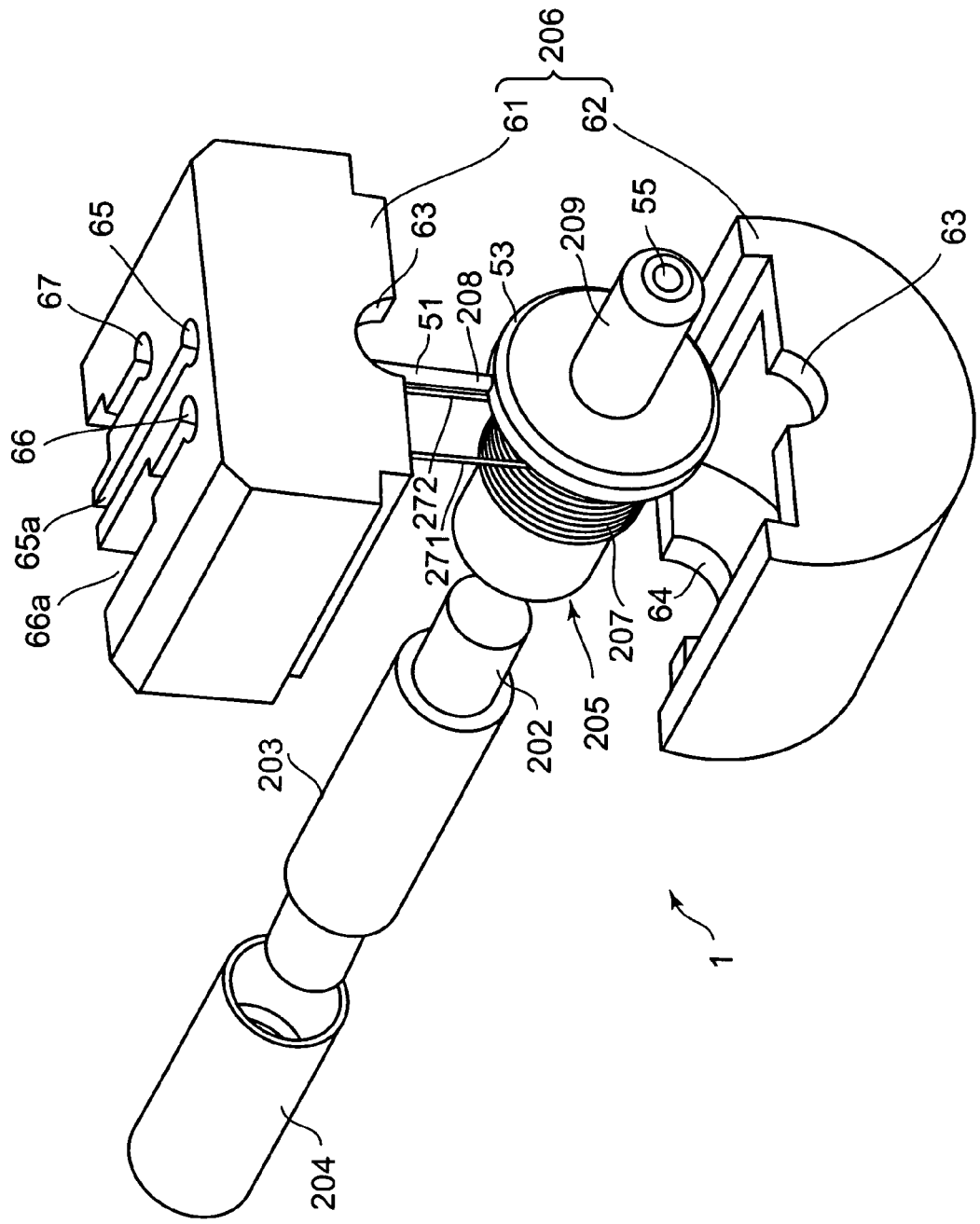
FIG. 13 is an exploded perspective view of a vaporizer.
Figure 14:
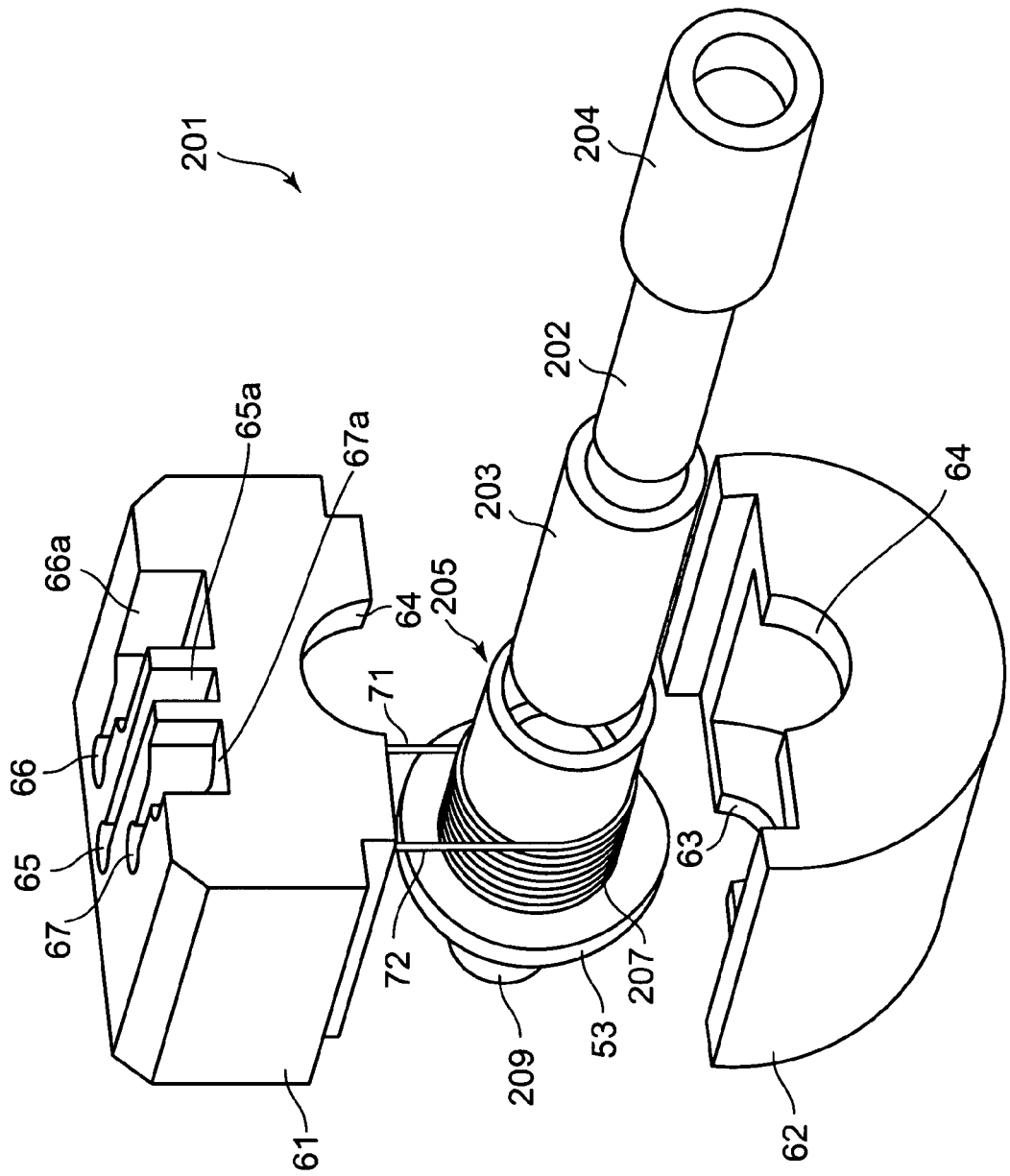
FIG. 14 is an exploded perspective view of a vaporizer.

FIG. 12 is a sectional view of a vaporizer 201. FIG. 13 is an exploded perspective view showing an upper surface, a front surface and a right surface. FIG. 14 is an exploded perspective view showing an upper surface, a back surface and a left surface.

As shown in FIGS. 12 to 14, the vaporizer 201 includes a liquid suction section 202 which liquid can penetrate, a contractile tube 203 having a member which contracts if it is heated or an elastic member such as a heat-resistant rubber having no or a small amount of double bond in a main chain of a molecular structure, a heat radiating section 204 which is in contact with a rear end of the liquid suction section 202, a heat transfer section 205 which transfers heat to the liquid suction section 202, a heat insulation case 206 which has a thermal conductivity lower than that of the heat transfer section 205 and which prevents heat of a front portion of the heated liquid suction section 202 from propagating to outside of the vaporizer 201, a heating section 207 for heating the liquid suction section 202, a temperature sensor 208 which measures the temperature of the liquid suction section 202 through the heat transfer section 205, and a discharging section 209 which discharges gas discharged by the liquid suction section 202.

The liquid suction section 202 is a core member formed into a rod-like shape, more specifically, a columnar shape. The liquid suction section 202 has such characteristics to take in liquid which comes into contact with the suction side end 202*b* and sucks the same to a discharging side end 202*a* by capillary action. More concretely, the liquid suction section 202 is a porous body provided with a fine space therein, the liquid suction section 202 can absorb liquid, and the liquid suction section 202 is made of material which does not melt and is not deteriorated even if it is heated by the heating section 207. The liquid suction section 202 may be a section obtained by solidifying an inorganic fiber or organic fiber using bonding material (e.g., epoxy resin), may be a section obtained by sintering inorganic powder, may be a section obtained by solidifying inorganic powder using bonding material (e.g., epoxy resin), or may be a porous mixture body of graphite and glassy carbon. The liquid suction section 202 may be a section obtained by binding a large number of thread materials comprising inorganic fiber or organic fiber using bonding material. For example, an acrylic fiber flux core may be used as the liquid suction section 202.

A center portion of the liquid suction section 202 is inserted into the contractile tube 203 so that the discharging side end 202*a* and the suction side end 202*b* are exposed, and an outer peripheral surface of the center portion of the liquid suction section 202 is in intimate contact with the contractile tube 203. The contractile tube 203 is shorter than the liquid suction section 202, and both ends 202*a* and 202*b* of the liquid suction section 202 are located at positions projecting from ends of the contractile tube 203.

Since liquid in the contractile tube 203 does not penetrate the liquid suction section 202, liquid does not leak outside from the contractile tube 203. The contractile tube 203 has preferably elastomer properties and has contractile. It is preferable that in a natural state where the liquid suction section 202 is not inserted into the contractile tube 203, the inner diameter of the contractile tube 203 is smaller than a diameter of the liquid suction section 202, and if the liquid suction section 202 is inserted, and the contractile tube 203 is increased in diameter in view of adhesion between the liquid suction section 202 and the contractile tube 203 and in view of liquid leakage prevention.

A portion of the liquid suction section 202 from its intermediate portion to the suction side end 202*b* is fitted into the tube-like heat radiating section 204. A portion of the liquid suction section 202 from its intermediate portion to the discharging side end 202*a* is fitted into the heat transfer section 205. There exists a gap between the heat radiating section 204 and the heat transfer section 205 so that they do not come into contact with each other.

A portion of the contractile tube 203 is also fitted into the heat radiating section 204 in a state where the liquid suction section 202 is inserted. An outer peripheral surface of a portion of the liquid suction section 202 projecting from the contractile tube 203 is in contact with an inner surface of the heat radiating section 204. For example, the heat radiating section 204 is made of material having a high thermal conductivity such as gold (thermal conductivity is 315 W/m·K), silver (thermal conductivity is 427 W/m·K), copper (thermal conductivity is 398 W/m·K), aluminum (thermal conductivity is 237 W/m·K), ceramic and carbon fiber. The thermal conductivity of the heat radiating section 204 is higher than those of the liquid suction section 202, the contractile tube 203 and the heat insulation case 206. It is preferable that the heat radiating section 204 has a tube structure, apparent volume is not too large, an area of a radiation surface is greater, and an outer surface of the heat radiating section 204 is formed with a groove.

The heat transfer section 205 has a thermal conductivity higher than that of the liquid suction section 202. The heat transfer section 205 is a cylinder in which the discharging side end 202*a* of the liquid suction section 202 is accommodated such that the discharging side end 202*a* comes into intimate contact with the heat transfer section 205. The heat transfer section 205 is integrally formed with the discharging section 209 having a portion exposed from the heat insulation case 206, and a flange 53 projecting from an outer edge of a joint between the heat transfer section 205 and the discharging section 209. The discharging section 209 projects from a flange surface of the flange 53. The discharging section 209 is provided with a discharge hole 55. The liquid suction section 202 inserted into the heat transfer section 205 vaporizes the inside liquid by heat of the heating section 207 and the generated gas is discharged from the discharge hole 55. The outer diameter of the discharging section 209 is smaller than that of the heat transfer section 205, and the inner diameter (diameter of the discharge hole 55) of the discharging section 209 is smaller than the inner diameter of the heat transfer section 205. It is preferable that the heat transfer section 205 includes material which can efficiently propagate heat of the heating section 207 to the liquid suction section 202 like metal having thermal conductivity higher than those of the contractile tube 203, the heat insulation case 206 and the liquid suction section 202 (e.g., brass Cu 70%, Zn 30%, thermal conductivity 106 W/m·K), and which can facilitate the vaporization of liquid.

The liquid suction section 202 is inserted into the heat transfer section 205, a portion of the contractile tube 203 is also inserted into the heat transfer section 205, and an outer peripheral surface of a portion of the liquid suction section 202 projecting from the contractile tube 203 is in contact with an inner surface of the heat transfer section 205.

The heating section 207 which is a heater such as a heating coil is wound around an outer periphery of the heat transfer section 205, and the heating section 207 and the heat transfer section 205 are in contact with each other. The heating section 207 comprises an electric heating material, and generates heat by electricity. A nickel-cobalt wire may be used as the heating section 207. When the heat transfer section 205 is a conductive member and the heating section 207 is a heating resistor such as an electric heating material, it is preferable that an insulative film (not shown) is interposed between the heat transfer section 205 and the heating section 207 so that applied voltage is efficiently divided to the heating section 207 and heated. However, if a portion of the heat transfer section 205 exposed from the heat insulation case 206 is sufficiently small, the insulative film may not be provided. The heating section 207 is coated with ceramic adhesive 56, and the heating section 207 is fixed to the heat transfer section 205 by the ceramic adhesive 56.

An insertion hole 54 is formed in the flange 53 in the radial direction. The insertion hole 54 does not reach internal spaces of the heat transfer section 205 and the discharging section 209, and a bottom of the insertion hole 54 is located near an end surface of the liquid suction section 202. Insulative adhesive is charged into the insertion hole 54 in a state where the temperature sensor 208 is inserted, and the temperature sensor 208 is coated with insulative adhesive. Therefore, even if the heat transfer section 205 is made of conductive member, the temperature sensor 208 and the heat transfer section 205 are electrically insulated from each other. The temperature sensor 208 is located near the end surface of the liquid suction section 202 and with this, the temperature sensor 208 is embedded into the flange 53. The temperature sensor 208 is a thermocouple, a thermistor or a resistance thermometer bulb. The temperature sensor 208 detects a temperature in accordance with heat of the heating section 207 transmitted through the heat transfer section 205 or an insulative adhesive.

If the heating element 7 is heated, liquid which penetrated into the liquid suction section 202 by heat propagated from the heating element 7 to the heat transfer section 205 is vaporized and is discharged out from the discharge hole 55.

The heat insulation case 206 covers front portions of the heating section 207 and the liquid suction section 202 so that heat of the heating section 207 and the front portion of the liquid suction section 202 heated by the heating section 207 is not released outside. The heat transfer section 205 and the flange 53 are accommodated in the heat insulation case 206, and the heating section 207 is also accommodated in the heat insulation case 206. The heat radiating section 204 is located outside of the heat insulation case 206.

If the entire liquid suction section 202 is equally heated, liquid is vaporized from the suction side end 202b of the liquid suction section 202. These bubbles causes steric hindrance, and hinders the penetration of liquid through the liquid suction section 202, and an amount of gas discharged from the discharging section 209 becomes instable.

Since a rear portion of the liquid suction section 202 is not covered with the heat insulation case 206, heat is easily released therefrom as compared with a portion of the liquid suction section 202 covered with the heat insulation case 206. Further, heat of the liquid suction section 202 is propagated to the heat radiating section 204 and is discharged out from the surface of the heat radiating section 204. Therefore, the temperature of the rear portion of the liquid suction section 202 does not reach the boiling point of liquid in the liquid suction section 202.

The heating section 207 heats the front portion of the liquid suction section 202 such that the temperature thereof reaches the boiling point of liquid which penetrates the liquid suction section 202. Therefore, if gas vaporized in the liquid suction section 202 is discharged out from the discharging side end 202a, liquid charged into the rear portion of the liquid suction section 202 spontaneously moves forward of the liquid suction section 202 by the capillary action of the liquid suction section 202.

An upper case 61 and a lower case 62 of the heat insulation case 206 are combined with each other, thereby forming an accommodation space in the heat insulation case 206. The upper case 61 and the lower case 62 are made of heat insulator having thermal conductivity lower than that of the heat transfer section 205 such as a ceramic obtained by sintering titanium oxide, potassium oxide, calcium oxide, silicon oxide, or PES (sulf-polyether), or engineering plastic such as styrene-foam and urethanefoam, and a glass.

Fan-like recesses are formed in a lower edge of a front surface of the upper case 61 and an upper edge of a front surface of the lower case 62, the upper case 61 and the lower case 62 are coupled to each other and as a result, the recesses are coupled to each other and a through hole 63 is formed therebetween. The discharging section 209 is fitted into the through hole 63, and the discharging section 209 projects from a front surface of the heat insulation case 206. The flange 53 of the heat transfer section 205 is in contact with an inner surface of the front surface of the heat insulation case 206 for fixing a position. To enhance the heat insulation, a space may be provided between the flange 53 and the inner surface of the front surface of the heat insulation case 9. If a groove is formed in a surface of the flange 53 opposed to the heat insulation case 9, the flange 53 and the heat insulation case 9 abut against each other so that alignment can be carried out, a gap having a low thermal conductivity for insulating heat can be formed by this groove, and this enhances the heat insulation effect.

Fan-like recesses are formed in a lower edge of a back surface of the upper case 61 and an upper edge of a back surface of the lower case 62, the upper case 61 and the lower case 62 are coupled to each other and as a result, the recesses are coupled to each other and a through hole 64 is formed therebetween. The contractile tube 203 and the liquid suction section 202 are fitted into the through hole 64. The contractile tube 203 and the wall surface of the through hole 64 come into intimate contact with each other, and a gap between the wall surface of the through hole 64 and the outer peripheral surface of the liquid suction section 202 is sealed by the contractile tube 203.

Wire-through holes 65 to 67 pass through an upper surface of the upper case 61, and grooves 65a to 67a which are in communication from the wire-through holes 65 to 67 to the back surface of the upper case 61 are formed in the upper surface of the upper case 61. A wire 51 of the temperature sensor 208 is inserted through the wire-through hole 65, the wire 51 is bent and laid in the groove 65a. Similarly, wires 271 and 272 of both ends of the heating section 207 are inserted through the wire-through holes 66 and 67, the wires 271 and 272 are bent and laid in the grooves 66a and 67a.

The temperature sensor 208 is connected to a controller 250 through the wire 51, and the heating section 207 is also connected to the controller 250 through the wires 271 and 272. A signal indicative of the detected temperature of the temperature sensor 208 is input to the controller 250, and the controller 250 controls the heating section 207 such that the temperatures of the heat transfer section 205 and of the discharging side ends 202a of the liquid suction section 202 become desired temperatures. More specifically, when the detected temperature of the temperature sensor 208 becomes higher than an upper threshold value, the controller 250 reduces or cuts off the electricity to be supplied to the heating section 207, and when the detected temperature of the temperature sensor 208 becomes lower than a lower threshold value (lower threshold value<upper threshold value), the controller 250 increases or tuns on the electricity to be supplied to the heating section 207, and when the detected temperature of the temperature sensor 208 is higher than the lower threshold value and lower than the upper threshold value, the controller 250 maintains the electricity to be supplied to the heating section 207.

Next, the operation of the vaporizer 201 and the vaporizing method using the vaporizer 201 will be explained.

If voltage is applied to the heating section 207, the heating section 207 is heated, and a member accommodated in the heat insulation case 206 is heated. In this state, if liquid is sent by a pump or the like into the heat radiating section 204 which also functions as a supply tube of liquid, the liquid in the heat radiating section 204 is sucked into the liquid suction section 202 from the suction side end 202b of the liquid suction section 202. The liquid sucked into the liquid suction section 202 moves toward the discharging side end 202a on the opposite side by the capillary action. The heating temperature at a portion inside of the heating element 7 is reduced as separating from the heating element 7. Therefore, in a state where the detected temperature of the temperature sensor 208 is higher than the lower threshold value and lower than the upper threshold value, the temperature is set such that the temperature reaches the boiling point of the liquid on the side of the discharging side end 202a of the liquid suction section 202 and the temperature is less than the boiling point of the liquid at the suction side end 202b. Thus, liquid is vaporized mainly in the liquid suction section 202 on the side of the discharging side end 202a. The gas is discharged out from the discharging side end 202a of the liquid suction section 202 through the discharge hole 55 of the discharging section 209. If liquid is vaporized and discharged out, liquid is continuously charged into the discharging side end 202a of the liquid suction section 202 from the suction side end 202b by the capillary action, and the vaporization of liquid is continuously carried out.

When liquid is being vaporized, the controller 250 feedback controls the heating section 207 based on the detected temperature of the temperature sensor 208. Therefore, the temperature of the heat transfer section 205 and the temperature of the liquid suction section 202 on the side of the discharging side end 202a can successively be managed and the temperatures can be kept in desired ranges with time.

According to this exemplary example, as described above, the discharging side end of the liquid suction section 202, the heat transfer section 205, the flange 53 and the heating section 207 are accommodated in the heat insulation case 206. Therefore, the heat loss is small, and the thermal energy of the heating section 207 is effectively utilized for the vaporization of liquid. If the temperature of the front portion of the liquid suction section 202 becomes instable by an external reason and the liquid suction section 202 is excessively heated, the vaporization is excessively facilitated in the liquid suction section 202 and this may cause the bumping. According to the exemplary example, however, since the heat of the front portion of the liquid suction section 202 is stored by the heat insulation case 206, the heat retention ability is high, influence caused by environment such as outside temperature of the vaporizer 201 is small and thus, the temperature control for vaporizing liquid stably can be carried out easily, and excessive heating can easily be prevented.

Since the suction side end of the liquid suction section 202 is located outside of the heat insulation case 206, the temperature gradient is generated from the suction side end 202b of the liquid suction section 202 to the discharging side end 202a, and the temperature of the suction side end 202b of the liquid suction section 202 becomes lower than that of the discharging side end 202a. Especially, since the suction side end of the liquid suction section 202 comes into contact with the heat radiating section 204 having high heat conduction and the heat radiating section 204 is located outside of the heat insulation case 206, heat of the suction side end of the liquid suction section 202 is prone to be radiated from the heat radiating section 204 naturally.

If the all gas which was excessively generated in the liquid suction section 202 due to excessive heating can not be discharged out from the discharging side end 202a and a portion thereof is discharged into the heat radiating section 204 from the surface of the suction side end 202b, the gas locally exists as bubbles such as to cover at least a portion of the suction side end 202b by capillary action of the liquid suction section 202 and driving force of the pump which sends liquid to the liquid suction section 202, and the bubbles causes steric hindrance, and reduces a taking-in area (contact area) of liquid of the suction side end 202b of the liquid suction section 202. Therefore, the amount of liquid penetrating the liquid suction section 202 is at least temporarily reduced and becomes instable. At that time, the amount of liquid in the liquid suction section 202 is reduced and liquid is excessively heated. Immediately after that, bubbles enter the liquid suction section 202 from the surface of the suction side end 202b. If the bubbles flow in the liquid suction section 202, since the bubbles have viscosity lower than that of the liquid, the flow velocity is temporarily increased, and liquid which flows at a dash bumps at the liquid suction section 202.

In the embodiment, however, the heat radiating section 204 efficiently discharges heat so that the temperature of the rear portion of the liquid suction section 202 can be kept lower than that of the front portion and thus, the gas is less prone to be heated excessively, the amount of vaporization is remarkably smaller than that of the front portion. Therefore, gas generated in the liquid suction section 202 does not reversely flow and gas is not discharged out toward the heat radiating section 204 from the suction side end 202b almost at all. For this reason, it is possible to prevent the rear portion of the liquid suction section 202 from being excessively heated, the amount of liquid penetrating the liquid suction section 202 can be stabilized, and the amount of gas discharged from the discharging section 209 can be stabilized. If a sufficient amount of liquid is continuously supplied into the liquid suction section 202, even if a small amount of bubbles is generated in the suction side end 202b, the bubbles are cooled and liquefied by liquid having lower temperature or the heat radiating section 204. Thus, the problem of the steric hindrance can swiftly be solved, and the variation in flow rate caused by bumping can be reduced.

Since it is possible to effectively radiate heat by the heat radiating section 204, it is unnecessary to elongate the liquid suction section 202 in the longitudinal direction to suppress the reverse flow of gas, or to increase the radiation area. Thus, the vaporizer 201 can be reduced in size.

Since the temperature sensor 208 is embedded in the flange 53, the temperature near the discharge side end surface of the liquid suction section 202 can precisely be measured. Since the controller 250 controls the temperature in accordance with the precise detected temperature, the temperature near the discharge side end surface of the liquid suction section 202 can be kept at constant level between the lower threshold value and upper threshold value, and stable vaporization can be carried out. Further, since the heat insulation case 206 can vertically be divided into the upper case 61 and the lower case 62, it is possible to operate while visually checking, and the assembling operability of the vaporizer 201 is enhanced.

Since the contractile tube 203 contracts if it is heated, the adhesion between the outer peripheral surface of the liquid suction section 202 and the inner peripheral surface of the contractile tube 203 is enhanced. Thus, gas does not inject from the outer peripheral surface of the liquid suction section 202.

In this invention, the temperature gradient is provided between the discharging side end and the suction side end of the liquid sucking section, thereby suppressing the bumping of liquid.

The present invention is not limited to the exemplary example, and various improvements and changes of design may be made within a range not departing from the subject matter of the invention.

For example, the heat radiating section 204 may be cooled by air by creating forced convection around the heat radiating section 204 by a fan or the like, and heat of the suction side end of the liquid suction section 202 may be radiated from the heat radiating section 204. The heat radiating section 204 may be cooled by water. When the heat radiating section 204 is cooled naturally, by air or by water, the outer surface of the heat radiating section 204 may be provided with bumps and dips, a fin may be projected, thereby increasing a surface area of the heat radiating section 204 and enhancing the radiating efficiency of the heat radiating section 204.

The heating section 207 may be a ceramic heater instead of the heating coil, or both the heating coil and ceramics heater may be used.

If the outer peripheral surface of the liquid suction section 202 is covered so that liquid or gas seeps through the outer peripheral surface of the liquid suction section 202, the contractile tube 203 may be omitted. Further, as the contractile tube 203, the liquid suction section 202 may be inserted into a double tube comprising a rubber elastic tube and a thermal contractile tube.

Figure 15:
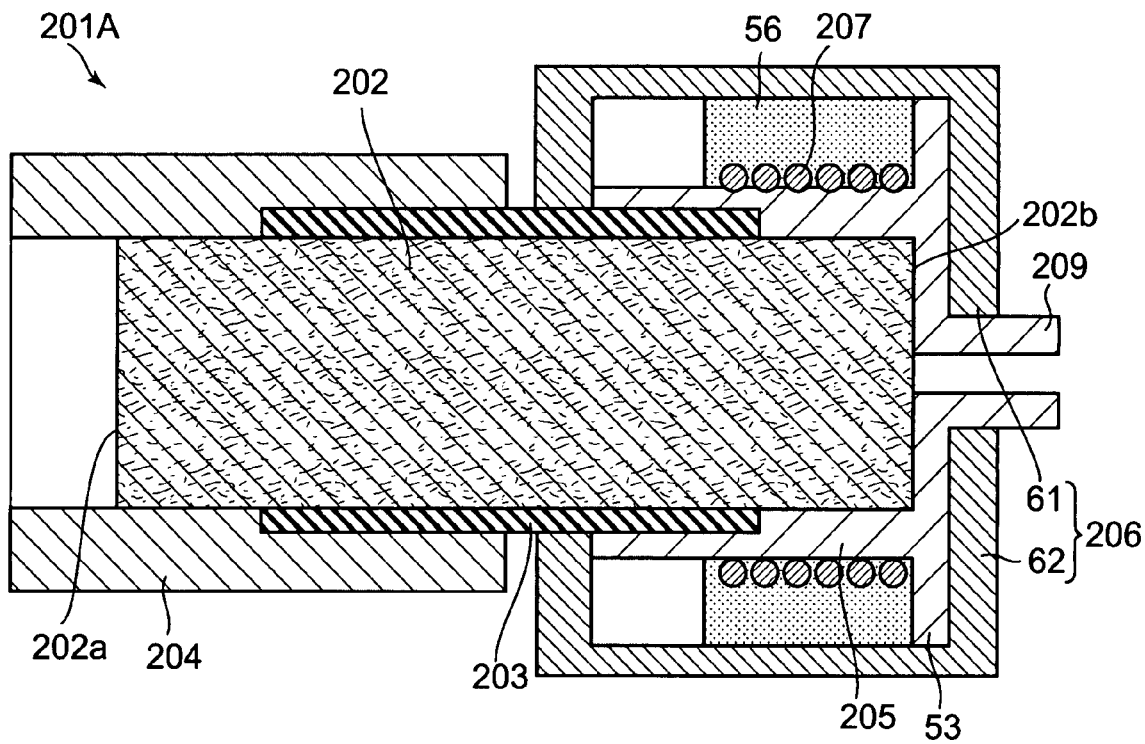
FIG. 15 is a vertical sectional view of a vaporizer of a modification.

Like a vaporizer 201A of a modification shown in FIG. 15, the temperature sensor 208 may be omitted. Since the vaporizer 201A is not provided with the temperature sensor 208, it is unnecessary to form the insertion hole 54 in the flange 53 and to form the wire-through hole 65 and the groove 65a in the upper case 61. The vaporizer 201A shown in FIG. 15 is the same as the vaporizer 201 shown in FIG. 12 except that the temperature sensor 208, the insertion hole 54 and the wire-through hole 65 are omitted. Therefore, members of the vaporizer 201A corresponding to those of the vaporizer 201 are designated with the same symbols. In the vaporizer 201A having such a structure, the heating section 207 may also function as a temperature sensor as a heating resistor whose resistance characteristics are varied depending upon the temperature. Gold (Au) and alloy including gold are preferable because displacement of resistivity of the heating resistor with respect to the temperature displacement is sufficiently large, and such metals are strong against deterioration such as oxidation and corrosion, and a laminated structure comprising a heating resistor including gold and the conductive film is also preferable. When heating element heat transfer section 205 is conductive, the heat transfer section 205 is coated with an insulative film and the insulative film is coated with a heat-generating resistant layer. If the heat-generating resistant layer includes gold, a backing layer such as titanium (Ti) and tantalum (Ta) for enhancing adhesion with respect to the insulative film, and a heat dispersion preventing layer made of metal having high melting point such as a tungsten (W) for suppressing heat dispersion of gold may be laminated between the insulative film and the heat-generating resistant layer in this order.

Figure 16:
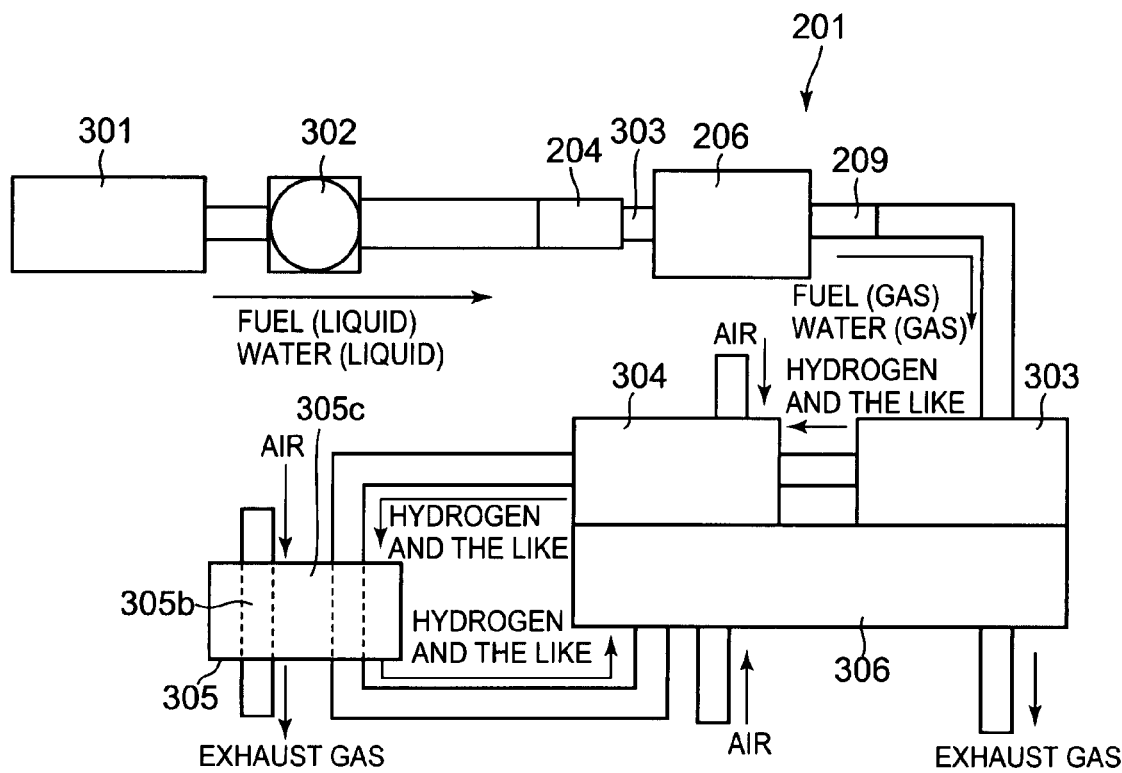
FIG. 16 is a block diagram of a vaporizer illustrated together with a cartridge, a pump, a reforming device, a carbon monoxide eliminating device, a fuel cell and a combustor.

FIG. 16 is a block diagram showing the vaporizer 201 (or vaporizer 201A) together with a cartridge 301, a reforming device 303, a carbon monoxide eliminating device 304, a fuel cell 105 and a combustor 306.

A pump 302 is connected to the heat radiating section 204, and the pump 302 is connected to the cartridge 301. Water and liquid fuel (e.g., methanol, ethanol, dimethyl ether) are stored in the cartridge 301 in the mixed state or separately, and mixture of liquid fuel and water is sent to the heat radiating section 204 by the pump 302. A syringe pump or an electro-osmotic pump may be used as the pump 302'. The reforming device 303 is connected to the discharging section 209, and mixture of fuel and water discharged from the vaporizer 201 is supplied to the reforming device 303.

The reforming device 303 makes fuel and water of the mixture supplied from the vaporizer 201 react with each other through catalyst to generate hydrogen gas. A very small amount of carbon monoxide is also produced in the reforming device 303. When liquid fuel stored in the cartridge 301 is methanol, the following reaction occurs in the reforming device 303 as shown in the following equations (1) and (2).

$$CH_3OH + H_2O \rightarrow 3H_2 + CO_2 \tag{1}$$

$$2CH_3OH + H_2O \rightarrow 5H_2 + CO + CO_2 \tag{2}$$

A mixture of product produced by the reforming device 303 is supplied to the carbon monoxide eliminating device 304, and air is supplied to the carbon monoxide eliminating device 304 by an air pump. In the carbon monoxide eliminating device 304, carbon monoxide in the mixture is selected by a catalyst, the carbon monoxide is subject to oxidation with higher priority, and hydrogen is not subject to oxidation.

The fuel cell 305 includes a fuel pole 305a carrying catalyst fine particles, an air pole 305b carrying catalyst fine particles, and an electrolyte film 305c interposed between the fuel pole 305a and the air pole 305b. A mixture is supplied to the fuel pole 305a from the carbon monoxide eliminating device 304, and air is supplied to the air pole 305b by an air pump. Ion is produced by one of the fuel pole 305a and the air pole 305b, the ion penetrates the electrolyte film 305c, water is produced by the other pole and with this, electricity is generated between the fuel pole 305a and the air pole 305b. When a hydrogen ion can penetrate the electrolyte film 305c (e.g., a solid high polymer electrolyte film), a reaction as shown in the following equation (3) occurs in the fuel pole 305a, and a reaction as show in the following equation (4) occurs in the air pole 305b.

$$H_2 \rightarrow 2H^+ + 2e^- \tag{3}$$

$$2H^+ + \tfrac{1}{2}O_2 + 2e^- \rightarrow H_2O \tag{4}$$

Offgas including excessive hydrogen gas which does not react by the fuel pole 305a is supplied to the combustor 306, and air is supplied to the combustor 306 by the air pump. In the combustor 306, oxygen in the air and unreacted hydrogen react with each other through a catalyst, and combustion heat is generated. The combustion heat is used for reaction between the reforming device 303 and the carbon monoxide eliminating device 304.

Embodiment 2

The present invention will be explained more concretely by way of an embodiment and a comparative example.

In the embodiment, the vaporizer 201 as shown in FIGS. 12 to 14 was used. Conditions of the liquid suction section 202, the heat radiating section 204, the heat transfer section 205 (integral type comprising the discharging section 209 and the flange 53) and the heat insulation case 206 are as follows:

(a) Liquid suction section 202: silicon carbide, a diameter is 1.5 mm, and a length is 10 mm, (b) Heat radiating section 204: aluminum (A1080), an inner diameter is 1.5 mm, an outer diameter is 2.5 mm, and a length is 15 mm, (c) Heat transfer section 205: brass, a superposing length of the liquid suction section 202 and the heating section 207 in the longitudinal direction is 2 mm, an inner diameter is 1.5 mm, and an outer diameter is 2.5 mm, and (d) Heat insulation case 206: PEEK (polyether ether ketone) and a diameter of a lower portion is 7 mm.

In the comparative example, the heat radiating section 204 of the vaporizer 201 was replaced by an elastic tube material having low thermal conductivity such as a silicon tube, and other conditions are the same as those of the embodiment.

Figure 17:
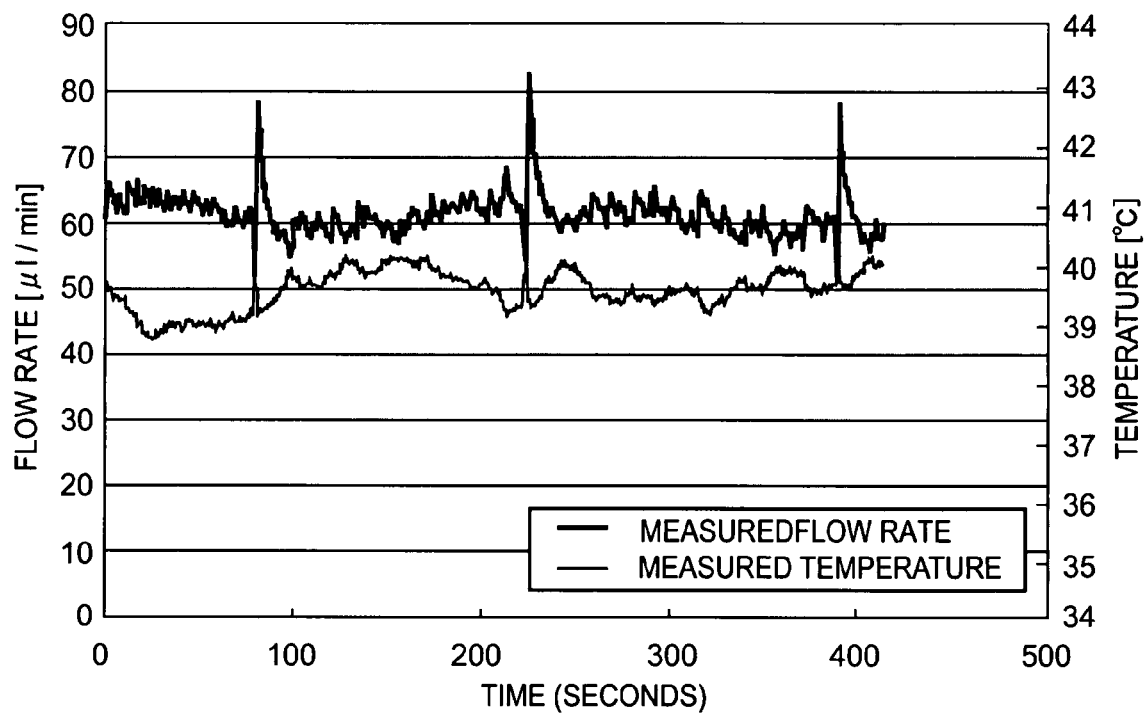
FIG. 17 is a graph showing a result of measurement of a comparative example.

In any of the embodiment and the comparative example, 60 wt % of methanol water solution was sent to the heat radiating section 204 through a flow rate meter by an electro-osmotic pump (tube material having low thermal conductivity in the case of the comparative example), a flow rate of the methanol water solution was measured by the flow rate meter, and the temperature near the suction side end 202b of the liquid suction section 202 was measured by a K-type sheath thermocouple. Here, in the embodiment and the comparative example, methanol water solution was supplied while keeping its heated state by the heating section 207. In FIG. 17, it can be found that the flow rate is lowered immediately before the measured flow rate is largely increased and the temperature rises. This is because that bubbles were generated on the side of the suction side end 202b, steric hindrance was caused, flow toward the liquid suction section 202 was stopped, and the liquid suction section 202 was temporarily heated excessively. Immediately after that, if the bubbles enter the liquid suction section 202, the flow rate is temporarily increased due to the low viscosity of the bubbles, a large amount of liquid which flowed into the liquid suction section 202 is vaporized and bumping is caused.

Figure 18:
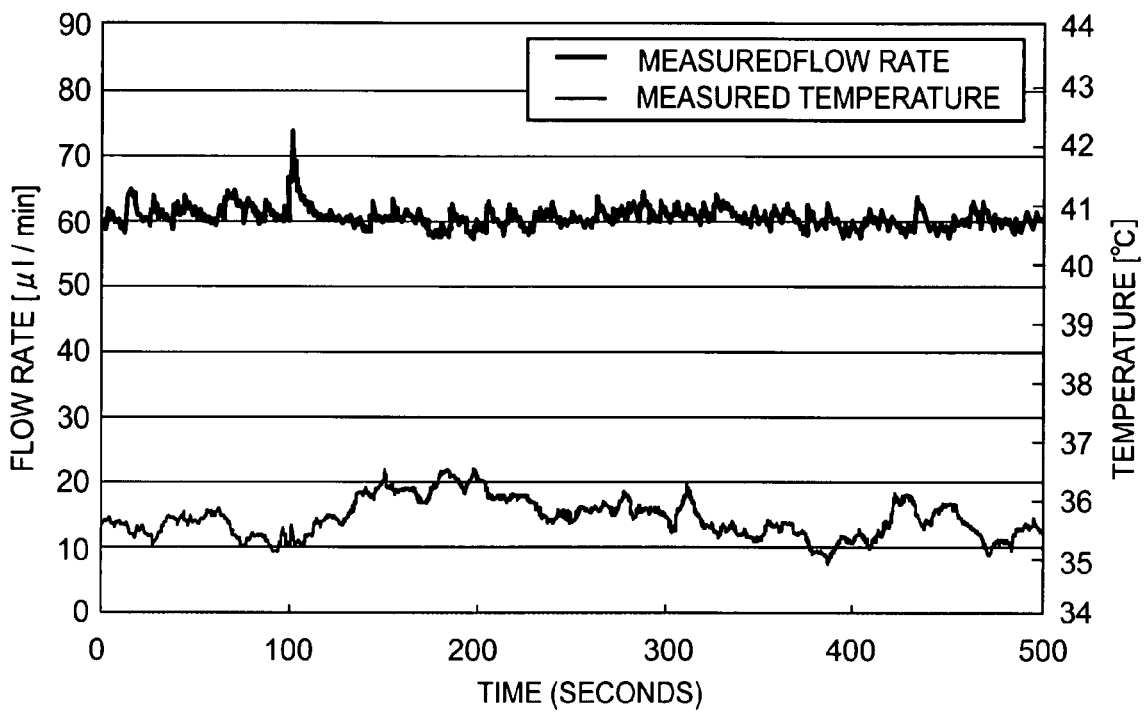
FIG. 18 is a graph showing a result of measurement of an embodiment 2.

FIG. 17 shows a result of the comparative example and FIG. 18 shows a result of the embodiment. As apparent from FIGS. 17 and 18, the temperature near the sucking side end surface of the liquid suction section 202 in the embodiment is lower than that of the comparative example.

For this reason, large pulsation (variation in flow rate and about 30 μl/min) was prone to be generated in the supplied liquid, and the peaks of the flow rate of the supplied liquid was generated about three times for about 400 seconds.

In the embodiment, there is no abrupt rise in temperature, pulsation is less prone to be generated in the supplied liquid, and a peak of the flow rate of the supplied liquid was generated only once for about 780 seconds, an interval between the bumpings (variation in flow rate, and less than 15 μl/min) and variation if flow rate are suppressed to low level. Almost no temporarily drop of flow rate was generated by bubbles unlike the comparative example and thus, a case in which liquid abruptly flows into the liquid suction section 202 immediately after that and bumping is generate is suppressed. It was found that in the embodiment, liquid supplied to the vaporizer 201 and gas discharged from the vaporizer 201 flow stably as compared with the comparative example.

The entire disclosure of Japanese Patent Application No. 2006-43708 filed on Feb. 21, 2006 including specification, claims, drawings and abstract, and the entire disclosure of Japanese Patent Application No. 2006-72227 filed on Mar. 16, 2006 including specification, claims, drawings and abstract are incorporated herein by reference in there entireties.

Although various exemplary embodiments have been shown and described, the invention is not limited to the embodiments shown. Therefore, the scope of the invention is intended to be limited solely by the scope of the claims that follow.

What is claimed is:

1. A vaporizer comprising:
   a first liquid suction section to suck a first liquid;
   a second liquid suction section to suck a second liquid; and
   a heating element to heat the first liquid suction section and the second liquid suction section to vaporize the first liquid and the second liquid;
   wherein the first liquid suction section and the second liquid suction section are concentrically laminated in a radial direction; and
   wherein a partition section is interposed between the first liquid suction section and the second liquid suction section.

2. The vaporizer according to claim 1, wherein the first liquid suction section is provided around the second liquid suction section.

3. The vaporizer according to claim 1, wherein the heating element is provided at an outer periphery of the first liquid suction section.

4. The vaporizer according to claim 1, wherein the heating element is provided on an end side of the first liquid suction section.

5. The vaporizer according to claim 1, wherein a space, through which an end of the first liquid suction section and an end of the second liquid suction section are in communication with each other, is provided.

6. The vaporizer according to claim 1, wherein the first liquid suction section is configured to suck, as the first liquid, a liquid which has a boiling point higher than a boiling point of the second liquid.

7. The vaporizer according to claim 1, wherein:
   the first liquid suction section is disposed so as to cover a periphery of the second liquid suction section;
   the heating element is provided at an outer circumference of the first liquid suction section; and
   the heating element (i) heats an end of the first liquid suction section to a temperature not less than a boiling point of the first liquid, (ii) sets another end of the first liquid suction section to a value less than the boiling point of the first liquid, (iii) heats an end of the second liquid suction section to a temperature not less than a boiling point of the second liquid, and (iv) sets another end of the second liquid suction section to a value less than the boiling point of the second liquid.

8. The vaporizer according to claim 1, further comprising a discharging section to cover an end of the first liquid suction section.

9. The vaporizer according to claim 1, wherein the heating element heats the second liquid suction section through the first liquid suction section.

10. A fuel cell system comprising:
the vaporizer according to claim 1;
a chemical reaction unit to generate hydrogen by using the first liquid and the second liquid which are vaporized in the vaporizer; and
a fuel cell to generate power by using the hydrogen.

11. A vaporizing method of liquid, comprising:
interposing a partitioning material between a plurality of liquid sucking sections;
allowing one end of each of the liquid sucking sections to absorb different kinds of liquids;
allowing the liquids respectively absorbed by the liquid sucking sections to penetrate the other ends; and
heating the other end of each of the liquid sucking sections to vaporize the liquids.

12. The vaporizing method according to claim 11, wherein the plurality of liquid sucking sections are concentrically laminated in a radial direction, a partitioning material is interposed between the plurality of liquid sucking sections, and a heater is provided at an outer periphery of an end of the outermost liquid sucking section.

13. The vaporizing method according to claim 12, wherein an outermost liquid sucking section from among the plurality of liquid sucking sections is supplied with a liquid having a highest boiling point from among the different kinds of liquids.

14. The vaporizing method according to claim 11, wherein the plurality of liquid sucking sections are laminated in a thickness direction, a partitioning material is interposed between the plurality of liquid sucking sections, and a heater is provided at a lower layer of an end of the lowermost liquid sucking section or at an upper layer of an end of the uppermost liquid sucking section.

15. The vaporizing method according to claim 14, wherein a liquid sucking section which is closest to the heater from among the plurality of liquid sucking sections is supplied with a liquid having a highest boiling point from among the different kinds of liquids.

16. A vaporizer comprising:
a first liquid suction section to suck a first liquid;
a second liquid suction section to suck a second liquid;
a heating element to heat the first liquid suction section and the second liquid suction section to vaporize the first liquid and the second liquid; and
a heat insulation case;
wherein:
the first liquid suction section and the second liquid suction section are concentrically laminated in a radial direction;
a partition section is interposed between the first liquid suction section and the second liquid suction section;
an end of the first liquid suction section and an end of the second liquid suction section are disposed outside of the heat insulation case;
a discharge side end of the first liquid suction section and a discharge side end of the second liquid suction section, for vaporizing and discharging the sucked first liquid and the sucked second liquid, respectively, are accommodated in the heat insulation case; and
the heating element heats the discharge side ends.

17. The vaporizer according to claim 16, further comprising a heat transfer section, provided between the heating element and the first liquid suction section, to transfer heat of the heating element to the first liquid suction section,
wherein the heat insulation case has a thermal conductivity lower than a thermal conductivity of the heat transfer section.

18. The vaporizer according to claim 1, wherein:
the first liquid suction section is disposed so as to cover a periphery of the second liquid suction section;
the heating element is provided at an end of the first liquid suction section; and
the heating element (i) heats said end of the first liquid suction section to a temperature not less than a boiling point of the first liquid, (ii) sets another end of the first liquid suction section to a value less than the boiling point of the first liquid, (iii) heats an end of the second liquid suction section to a temperature not less than a boiling point of the second liquid, and (iv) sets another end of the second liquid suction section to a value less than the boiling point of the second liquid.

* * * * *